United States Patent
Game et al.

(10) Patent No.: US 9,999,295 B1
(45) Date of Patent: Jun. 19, 2018

(54) CONSOLE AND CONSOLE SUPPORT STRUCTURE

(71) Applicant: Evans Consoles Corporation, Calgary, Alberta (CA)

(72) Inventors: Richard Game, Calgary (CA); Matko Papic, Calgary (CA); Carlos Renderos, Calgary (CA)

(73) Assignee: Evans Consoles Corporation, Calgary (CA)

( * ) Notice: Subject to any disclaimer, the term of this patent is extended or adjusted under 35 U.S.C. 154(b) by 0 days. days.

(21) Appl. No.: 15/581,853

(22) Filed: Apr. 28, 2017

(51) Int. Cl.
| A47B 21/00 | (2006.01) |
| A47B 21/04 | (2006.01) |
| A47B 21/02 | (2006.01) |
| A47B 21/06 | (2006.01) |
| A47B 13/02 | (2006.01) |

(52) U.S. Cl.
CPC .............. *A47B 21/04* (2013.01); *A47B 13/02* (2013.01); *A47B 21/02* (2013.01); *A47B 21/06* (2013.01); *A47B 2021/064* (2013.01)

(58) Field of Classification Search
CPC ......... A47B 21/04; A47B 21/00; A47B 21/02; A47B 21/06; A47B 2021/062; A47B 2021/064; A47B 17/02
See application file for complete search history.

(56) References Cited

U.S. PATENT DOCUMENTS

| 4,382,642 A | 5/1983 | Burdick | |
| 5,035,470 A | 7/1991 | Miller | |
| 5,083,512 A * | 1/1992 | Newhouse | A47B 21/06 108/50.02 |
| 5,451,101 A * | 9/1995 | Ellison | A47B 21/06 248/74.2 |
| 6,152,048 A * | 11/2000 | Vander Park | A47B 17/003 108/50.02 |
| 6,286,441 B1 * | 9/2001 | Burdi | A47B 9/00 108/147 |
| 6,848,369 B1 * | 2/2005 | King | A47B 21/06 108/50.01 |
| 6,857,712 B1 * | 2/2005 | Haberman | A47B 21/00 108/102 |
| 7,077,068 B1 * | 7/2006 | Agee | A47B 9/00 108/147 |
| 7,992,349 B2 | 8/2011 | Haberman | |
| 8,196,526 B2 * | 6/2012 | Rheault | A47B 13/10 108/50.01 |
| 9,635,932 B2 * | 5/2017 | Kelley | A47B 21/06 |

(Continued)

*Primary Examiner* — Daniel J Rohrhoff
(74) *Attorney, Agent, or Firm* — Notaro, Michalos & Zaccaria P.C.

(57) ABSTRACT

Many traditional consoles struggle with changing user needs. Many existing technical furniture and consoles are custom manufactured, but may be expensive and/or cumbersome to design and assemble. According to some embodiments, there is provided a console support structure that includes two or more leg structures horizontally spaced apart. Each leg structure includes a respective base and at least one respective vertically adjustable support mounted on the base. For each adjacent pair of leg structure, a respective elongated lateral support structure extends between and interconnects the first and second leg structures. At least one work surface may be mounted on and supported by the vertically adjustable supports of the leg structures.

19 Claims, 37 Drawing Sheets

(56) References Cited

U.S. PATENT DOCUMENTS

| | | | |
|---|---|---|---|
| 9,655,438 B1 * | 5/2017 | Shoenfeld | A47B 21/02 |
| 9,723,920 B1 * | 8/2017 | Wu | A47B 21/02 |
| 2003/0020381 A1 * | 1/2003 | Cattaneo | A47B 21/06 |
| | | | 312/223.6 |
| 2014/0020606 A1 * | 1/2014 | Benden | A47B 13/00 |
| | | | 108/50.14 |
| 2014/0261094 A1 | 9/2014 | Parshad | |
| 2017/0360188 A1 * | 12/2017 | Alguire | A47B 9/00 |

* cited by examiner

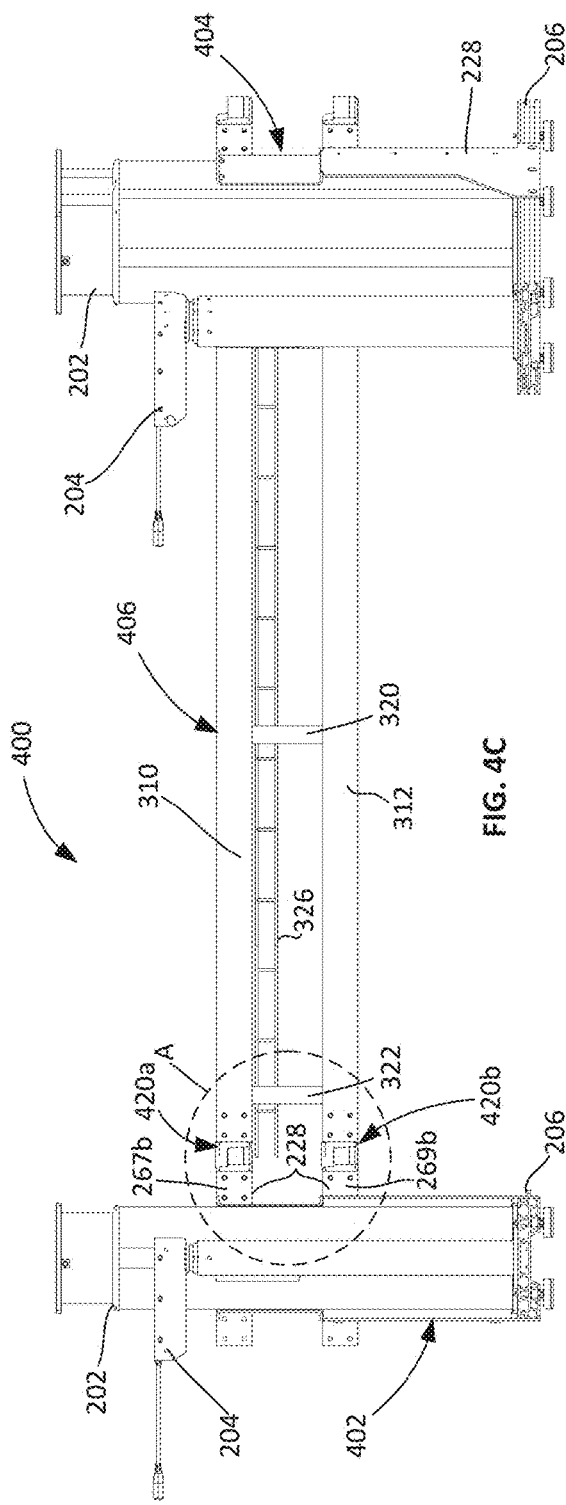
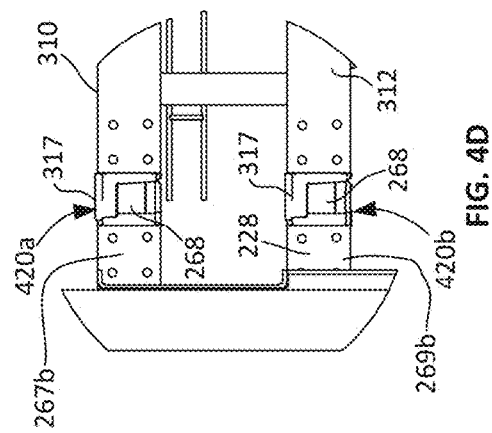

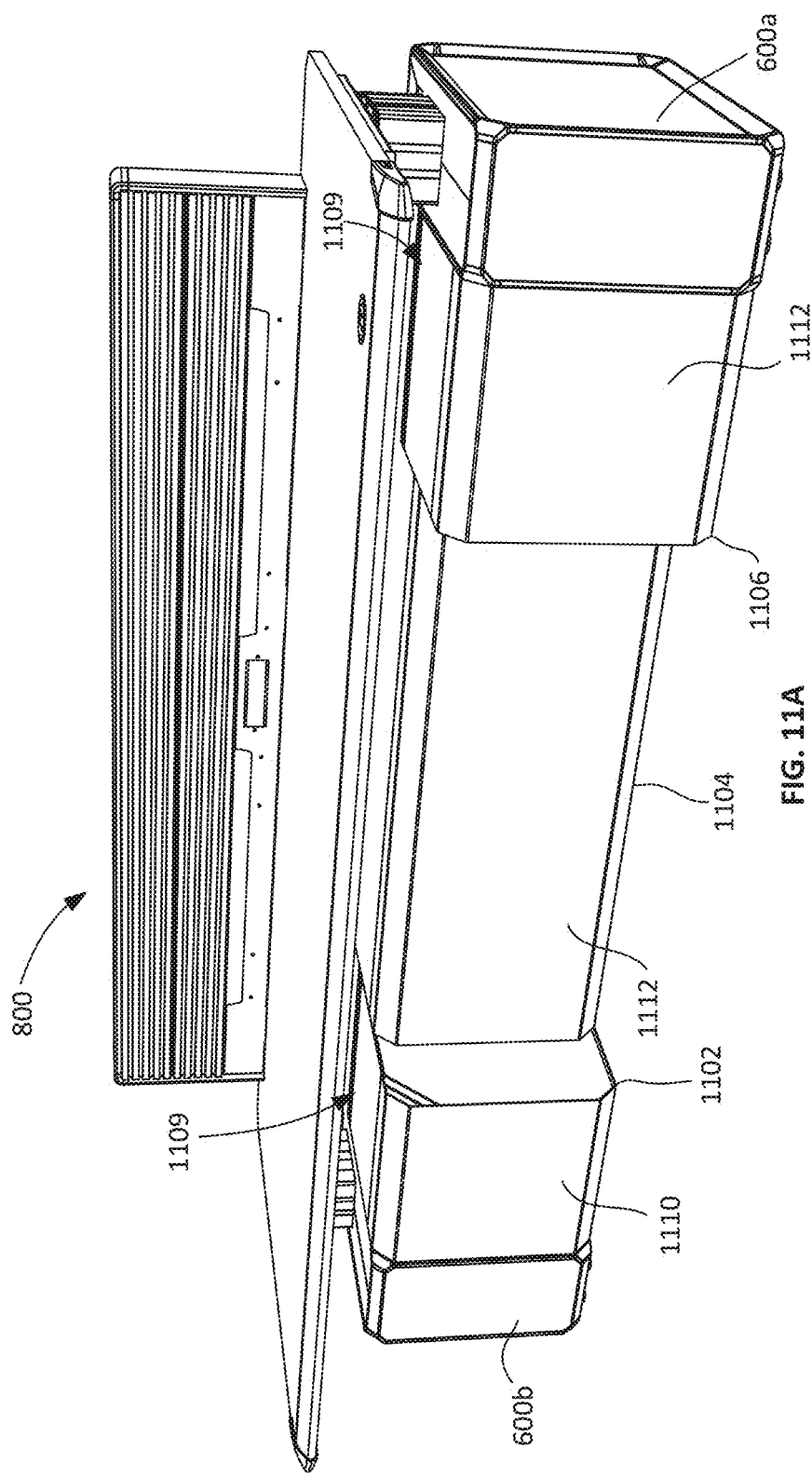

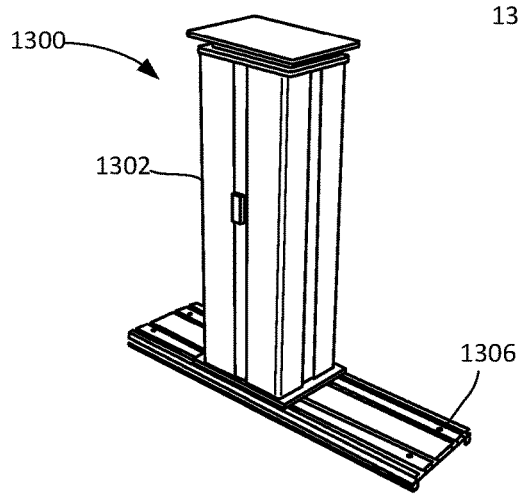
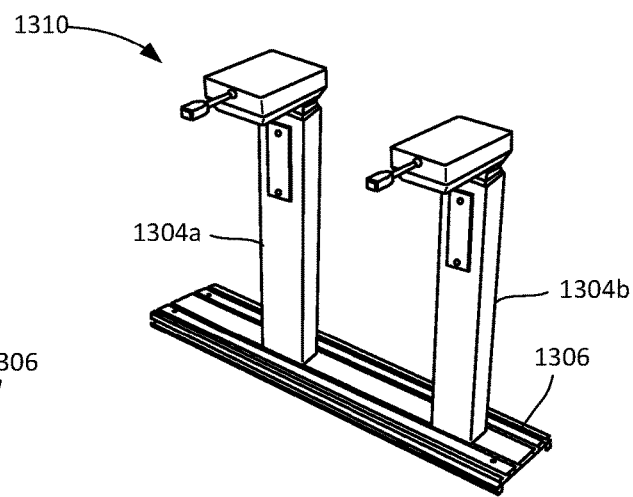
FIG. 13A  FIG. 13B
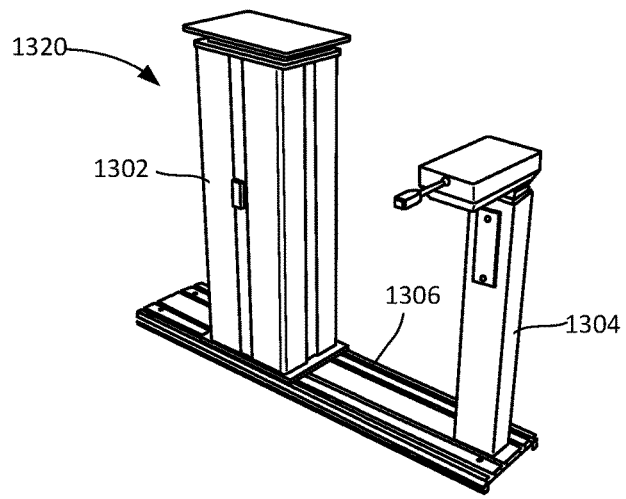
FIG. 13C

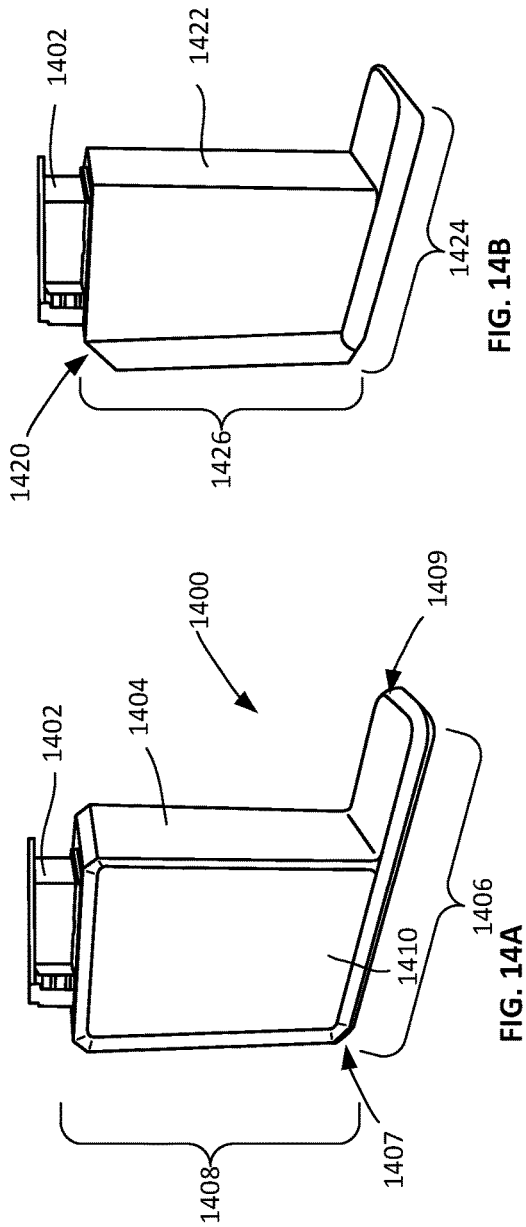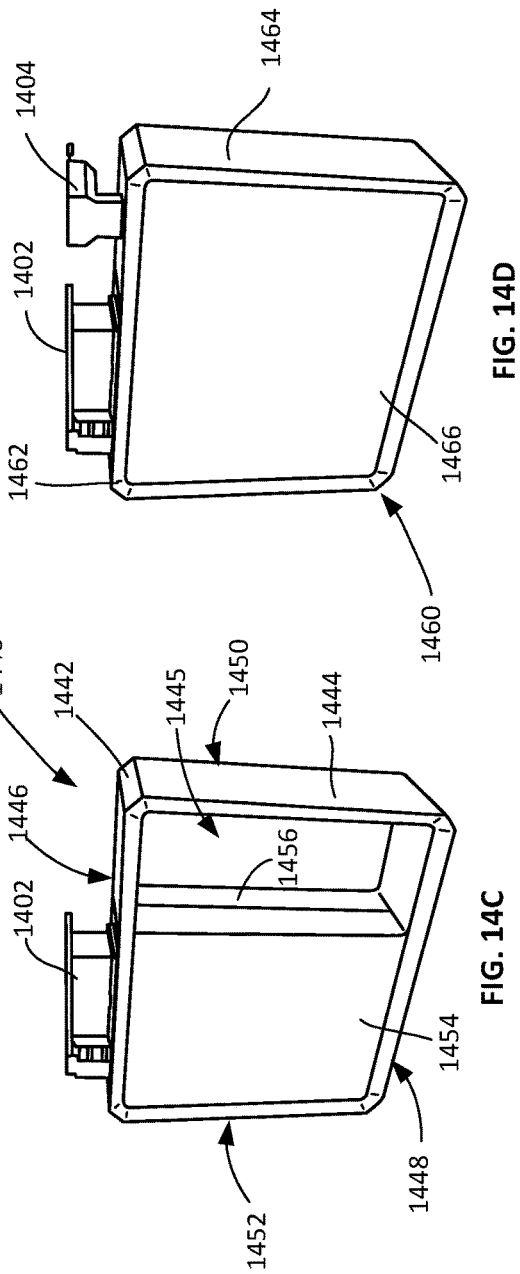

CONSOLE AND CONSOLE SUPPORT STRUCTURE

FIELD OF THE DISCLOSURE

Aspects of the disclosure relate to consoles and console systems having one or more work surfaces. In particular, some aspects relate to customizable or modular consoles.

BACKGROUND

Consoles are used in a variety of different applications, including in control rooms, on trading floors, and in operations centers. Consoles are typically used in the place of generic office equipment. Consoles may provide an enhanced human machine interface by allowing for the positioning of equipment in the more useful and efficient positions. Furthermore, consoles may be adapted to support more equipment compared to generic office equipment.

Many traditional consoles struggle with changing user needs. Many existing forms of technical furniture and consoles are custom manufactured, which in terms of design and construction may be expensive and time consuming. This approach is usually necessitated by customer requirements that are often unique in terms of work station size, equipment placement, human engineering and cost considerations. As a result, the completed console structures may not only be very expensive, but may also be difficult to subsequently modify for the reconfiguration of existing equipment or to retrofit new equipment.

Furthermore, many existing systems do not provide a low-cost solution that allows for a high degree of customization in terms of size, shape and layout of the consoles. In many instances, end users desire a console having custom physical dimensions and features. For example, a user may desire a console that is customized to fit a particular room layout. The room could have a curved or sloped wall, one or more support pillars, a multi-level floor, etc. In another example, a user may desire that the configuration of the console be tailored for a specific application, or to hold and support specific equipment. Many existing furniture systems and console systems come in one or a number of standard sizes and shapes in an attempt to provide a "best fit". However, such systems are generally not easily customizable in terms of size, shape or configuration.

SUMMARY

According to one aspect, there is provided a console support structure comprising: two or more leg structures horizontally spaced apart, each said leg structure comprising a respective base and at least one respective vertically adjustable support mounted on the base, the vertically adjustable supports of the leg structures being for supporting at least one work surface; for each adjacent pair of leg structures, a respective elongated lateral support structure extending between and interconnecting the pair of leg structures.

In some embodiments, the at least one lateral support structure is elevated with respect to the bases of the leg sections.

In some embodiments, each lateral support structure comprises a respective interior space along a length of the lateral support structure for at least one of equipment storage and cable management.

In some embodiments, each lateral support section comprises at least one cable raceway within the interior space.

In some embodiments, each lateral support structure is releasably and pivotably connected to the respective pair of leg structures.

In some embodiments, each said leg structure comprises at least one respective pivot connector for pivotably connecting to the corresponding one or more lateral support structures, and each said lateral support structure is releasably and pivotably connected to the pivot connectors of the corresponding pair of leg structures.

In some embodiments, each lateral support structure comprises one or more support beams interconnecting the respective pair of leg structures, each support beam having opposite first and second ends, each said end being releasably and pivotably connected to the respective leg structure.

In some embodiments, each lateral support structure further comprises: a respective plurality of spaced apart frames, each said frame being mounted to the at least one support beam; and a plurality of outer covers mounted to at least one of: the at least one support beam; and the frames.

In some embodiments, the at least one support beam comprises first and second beams that are vertically spaced apart, vertically aligned and substantially parallel.

In some embodiments, for each leg structure, the at least one vertically adjustable support comprises at least one vertical lift.

In some embodiments, for each said leg structure, the respective base defines at least one elongated port for receiving fastening hardware to selectively secure the at least one vertically adjustable support to the base at variable positions along a length of the at least one elongated port.

According to another aspect, there is provided a console comprising: the console support structure described herein; and the at least one work surface, mounted on and supported by the vertically adjustable supports of the leg structures.

In some embodiments, for each leg structure, the respective at least one vertically adjustable supports comprises first and second spaced apart vertically adjustable supports, the at least one work surface comprising a first work surface mounted to and supported by the first vertical lifts of the leg structures and second work surface further comprising a second work surface mounted to and supported by the second vertical lifts of the leg structures.

In some embodiments, the console further comprises at least one storage compartment attachable to the lateral support structure.

In some embodiments, said at least one storage compartment comprises wheels for rolling the at least one storage compartment into a position abutting the lateral support structure.

In some embodiments, each lateral support structure comprises one or more support beams, at least one of said at least one storage compartment is attachable to at least one of said one or more support beams.

In some embodiments, the at least one storage compartment is for storing computer hardware.

According to another aspect, there is provided a console support structure comprising: two or more leg structures horizontally spaced apart, each said leg structure comprising a respective base; for each adjacent pair of leg structures, a respective elongated lateral support structure extending between and interconnecting the pair of leg structures, the lateral support structure being releasably and pivotably connected to each of the pair of leg structures for allowing adjustment of the relative angle of the leg structures with respect to the lateral support structure.

According to another aspect, there is provided a console support structure comprising: two or more leg structures horizontally spaced apart, each said leg structure comprising a respective base; for each adjacent pair of leg structures, a respective elongated lateral support structure extending between and interconnecting the pair of leg structures, the lateral support structure comprising an accessible internal space along a length of the lateral support structure for at least one of: equipment storage and cable management.

According to another aspect, there is provided a console support structure comprising: two or more leg structures horizontally spaced apart, each said leg structure comprising a respective base and at least one respective vertically adjustable support mounted on the base, the vertically adjustable supports of the leg structures being for supporting at least one work surface, wherein, for each said leg structure, the respective base defines at least one elongated port for receiving fastening hardware to selectively secure the at least one vertically adjustable support to the base at variable positions along a length of the at least one elongated port.

Other aspects and features of the present disclosure will become apparent, to those ordinarily skilled in the art, upon review of the following description of the specific embodiments.

BRIEF DESCRIPTION OF THE DRAWINGS

Aspects and embodiments of the disclosure will now be described in greater detail with reference to the accompanying diagrams, in which:

FIG. 4C is a front view of the console support structure of FIGS. 4A and 4B;

FIG. 4D is an enlarged view of the portion of the console support structure within the circle marked "A" in FIG. 4C;

FIG. 11A is a front perspective view of the console of FIG. 8 with storage compartments according to another embodiment attached;

FIGS. 13A to 13C are perspective views of example leg structures according to some embodiments;

FIGS. 14A to 14D are perspective views of example leg structures according to some embodiments;

DETAILED DESCRIPTION

Figure 1:
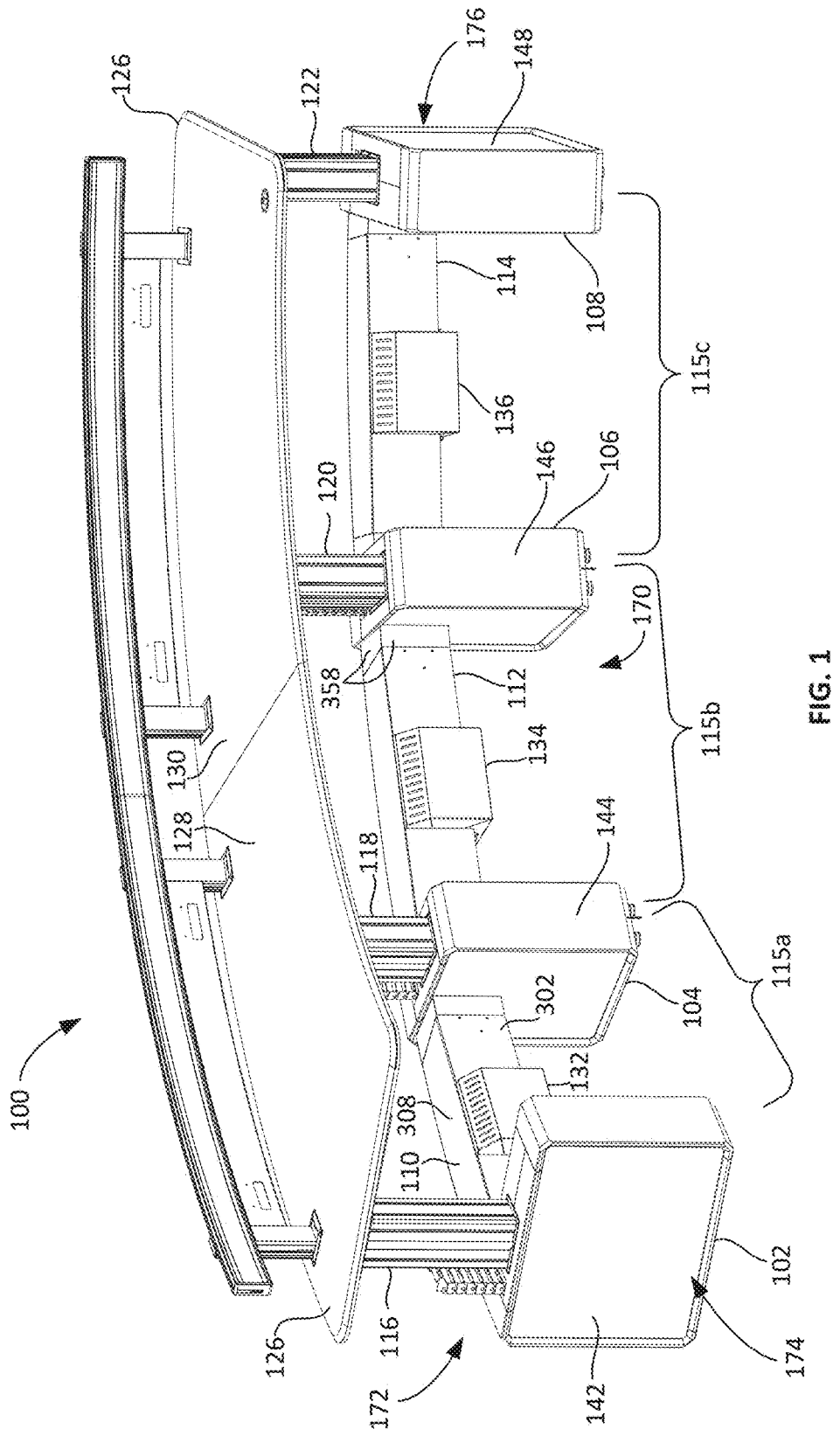
FIG. 1 is a front perspective view of an example console according to some embodiments of the disclosure.

A console support structure according to some embodiments includes two or more leg structures horizontally spaced apart and interconnected by one or more elongated lateral support structures. Each leg structure includes a respective base and at least one respective vertically adjustable support (such as a lift) mounted on the base for supporting one or more work surfaces. For each adjacent pair of leg structures, a respective one of the one or more elongated lateral support structures extends between and interconnects the leg structures. For example, at least one work surface mounted on and supported by the vertically adjustable supports of the leg structures. By adjusting the height of the work surface, the console may, for example, provide both a sitting configuration and a standing configuration. For a sitting configuration, the work surface may be positioned at a height appropriate for a user to sit at the console. For a standing position, the work surface may be positioned at a height appropriate for a user to stand at the console. The vertical movement may manual or motor driven. The console may be provided with an input device (e.g. one or more buttons) coupled to one or more motors that drive the vertical movement of the work surface. The console may thereby allow a user to control the height.

The console embodiments described herein may provide various benefits. Each of the one or more lateral support structures (interconnecting the leg structures) may be pivotably connected to the corresponding pair of leg structures to allow horizontal pivoting of the leg structures with respect to the lateral support structure. Thus, the relative angle of the leg structures and the lateral support structure may be adjustable and reconfigurable. This angle adjustment may provide for customization of the layout of the console. The lateral support structure(s) and leg structures may include male/female pivot castings that may easily connect to form pivot hinges to allow for relatively simple assembly and/or disassembly.

In some embodiments, the base of the leg structures provides additional customizability of the console. One or more vertically adjustable supports (e.g. lifts or other support including a vertical actuating mechanism) of varying sizes and configurations may be mounted on the base in variable positions. In some embodiments, the base of the leg structure comprises an extrusion (e.g. metal extrusion) with ports along its length for attaching the one or more vertically adjustable supports in variable positions. Thus, the number and positioning of the one or more vertically adjustable supports on each base may be customized. Vertically adjustable supports of various types and/or other equipment may be interchangeable. The vertically adjustable supports may thereby be configured to support one or more work surfaces in various configurations. The length of the base may also vary. The leg structure may be positioned with its base oriented lengthwise perpendicular (approx. 90 degrees) to the lateral support structure. However, as mentioned above, that angle may be adjusted. For example, the angle may be adjustable up to +45 degrees or −45 degrees or more than 45 degrees in some embodiments. The angle may even be adjustable up to positive or negative 90 degrees from the perpendicular position depending on the clearance between the leg structures and the one or more lateral support structure.

The one or more lateral support structures interconnecting the leg structures may provide structural support and additional benefits. In some embodiments, the lateral support structures provide cable pathways and/or storage space for other equipment therein. Storage compartments of various sizes and configurations may be attached (e.g. releasably attached) to the support structure of the console. For example, one or more storage compartments may attach to, and be removable from the lateral support structures. A storage compartment may, for example, slide along the lateral support structure and be fixed in various positions. Various examples of storage compartments are shown in the drawings and described herein.

FIG. 1 is a front perspective view of a console 100 according to some embodiments of the disclosure. The console 100 includes a plurality of horizontally spaced apart leg structures 102, 104, 106 and 108 (including first leg structure 102, second leg structure 104, third leg structure 106 and fourth leg structure 108). Each leg structure 102, 104, 106 and 108 includes a respective vertically adjustable lift 116, 118, 120 and 122 mounted on a base (e.g. base 206 shown in FIG. 2B). Rather than lifts, other types of vertically adjustable supports may be used in other embodiments.

The lifts shown and described herein (including lifts 116, 118, 120 and 122 in FIG. 1) may be motor driven and may be coupled to one or more controls that accept user input to control the height of the lifts, and thus, the height of the work surface(s) mounted on the lifts. Any suitable means for controlling lifts or other actuators may be used, and embodiments are not limited to any particular means of control. For example, buttons or a user terminal (including a display and user interface) may be used to control the lifts.

The console 100 in FIG. 1 also includes a first elongated lateral support structure 110, a second elongated lateral support structure 112 and a third elongated lateral support structure 114. Each lateral support structure 110, 112 or 114 interconnects a respective adjacent pair of leg structures 102, 104, 106 and 108. Specifically, the first lateral support structure 110 interconnects the first and second leg structures 102 and 104. The second lateral support structure 112 interconnects the second and third leg structures 104 and 106. The third lateral support structure 114 interconnects the third and fourth leg structures 106 and 108. The lateral support structures 110, 112 or 114 are releasably and pivotably connected to the corresponding leg structures 102, 104, 106 and 108 in this example, as will be discussed below.

The lateral support structures 110, 112 and 114 are elevated with respect to the bases of the leg structures 102, 104, 106 and 108. In other words, the lateral support structures 110, 112 and 114 will be elevated from the floor or ground surface upon which the console sits.

The lateral support structures 110, 112 or 114 may be partially or substantially hollow, defining an interior space therein. The lateral support structures 110, 112 or 114 in this example are duct-like structures in that they define an at least partially hollow interior space along their length. The interior space provides one or more cable routing paths or raceways and/or equipment storage space. The term "cable raceway" may refer to any structure (e.g. tray, basket, etc.) that provides a channel or pathway for guiding and/or managing cables. Various equipment may also be stored within the lateral support structures 110, 112 or 114. Such equipment may include, but is not limited to, power bars, cords, computer hardware, etc. The lateral support structures 110, 112 or 114 may also provide structural support for the console 100.

The lateral support structures 110, 112 and 114 are pivotably connected to the respective leg structures 102, 104, 106 and 108 such that the angle of the leg structures with respect to the lateral support structures 110, 112 and 114 and with respect to each other is adjustable. As mentioned above, the angle may be, for example, be in the range of 45 to 135 degrees or more. In other words, the angle may vary from −45 to +45 degrees from the typical right angle arrangement. The leg structures 102, 104, 106 and 108 pivotably connect to the lateral support sections 110, 112 or 114 in a manner similar to the example embodiments shown in FIGS. 4C, 4D, 7A and 7B and described below. Thus, the layout of the console 100 may be customized. The leg structures 102, 104, 106 and 108 and lateral support structures 110, 112 or 114 together form a support structure for the console 100.

The console 100 in FIG. 1 is described herein as generally having a front 170, rear 172, a first side 174 and second opposite side 176 as shown in FIG. 1. These positional references and corresponding directions (e.g. forwards, rearward, etc.) are used for ease of description and do not limit the orientation or use of the console 100. Similar terminology used with respect to other embodiments described herein is likewise for ease of description.

In this example, a work surface 126 is mounted on the lifts 116, 118, 120 and 122. The work surface 126 includes first and second sections 128 and 130 in this example (although a work surface may be a single section in other embodiments). The first section 128 of the work surface 126 is mounted to the lifts 116 and 118 of the first and second leg structures 102 and 104. The second section 130 of the work surface 126 is mounted to the lifts 120 and 122 of the third and fourth leg structures 106 and 108. The lifts 116, 118, 120 and 122 are each vertically adjustable. Thus, the work surface 126 is also vertically adjustable by adjustment of the lifts 116, 118, 120 and 122. The first and second sections 128 and 130 of the first work surface 126 may be connected such that the entire first work surface 126 has the same height. Alternatively, the first and second sections 128 and 130 may be independently adjustable.

In some embodiments, one or more additional work surfaces may be supported. For example, the leg structures may each include two or more lifts. First lifts of the leg structures may collectively support a first work surface and second lifts of the leg structures may collectively support a second work surface. One or both work surfaces may be independently and vertically adjustable. This arrangement may be referred to as a "split" work surface.

The console 100 in FIG. 1 includes the four leg structures 102, 104, 106 and 108 and three interconnecting lateral support structures 110, 112 and 114 that form three support structure segments 115a, 115b and 115c as shown. However, consoles in other embodiments may have more or fewer sections. The total number of segments for a given console support structure may vary, and consoles described herein may be customizable by adding or removing one or more lateral support structures and/or leg structures.

The console 100 optionally includes computer hardware storage compartments or enclosures mounted to the support structure. The console 100 may provide both "open" and "closed" configurations as will be discussed in more detail below. For an "open" configuration, the space between two or more leg structures may be substantially or partially open (as in the example of FIG. 1). For a "closed" configuration, the space between two or more leg structures may be substantially closed (e.g. occupied by storage compartments). For example, one or more storage compartments may attach to lateral support structures 110, 112 or 114 and/or to one or more leg structures 102, 104, 106 or 108. The storage compartments may substantially fill the space between the leg structures. Example "closed" configurations are shown in FIGS. 11A, 11B, 17A and 17B.

In the example of FIG. 1, first, second and third optional "thin client" storage compartments 132, 134 and 136 are each attached to a respective one of the lateral support structures 110, 112 and 114. The "thin client" storage compartments 132, 134 and 136 may each be sized to store computer hardware, such as a thin client. The term "thin client" refers to a lightweight computer that is purpose-built for remote access to a server. However, it will be appreciated that other hardware may be stored within the example storage compartments 132, 134 and 136, and embodiments are not limited to any particular equipment or hardware. The storage compartments 132, 134 and 136 may be mountable anywhere along the lengths of the first, second, and third lateral support structures 110, 112 and 114 using any suitable mounting means including, but not limited to screws or bolts, clips, adhesives, ports or grooves, etc. For example, the storage compartments 132, 134 and 136 may each include a removable clip (not shown) for mounting to the lateral support structures 110, 112 and 114. Any suitable method to mount an enclosure to the lateral support structures 110, 112 and 114 may be used.

More than one enclosure or storage compartment (such as thin client storage compartments 132, 134 and 136) may be mounted to a lateral support structure (such as lateral support structures 110, 112 and 14) in other embodiments. The number of enclosures or compartments that may be mounted may be limited by the length of the lateral support structure and the size of the enclosures/compartments.

Storage compartments or housings of various sizes may also be mounted to the lateral support structures 110, 112 or 114. Equipment may also be mounted directly to the lateral support structures 110, 112 or 114 without an enclosure or housing for the equipment. Such equipment includes, but it not limited to computer hardware such as CPUs, routers, power bars, power supplies, modems etc.

The console 100 also optionally includes a slat rail 140 mounted above the work surface 126. Although not shown in FIG. 1, a slat wall (rather than the rail 140) may be mounted to the work surface 126. The work surface 126 and/or slat rail 140 may support various equipment including, but not limited to, computer hardware, displays, display mounts, and/or other console equipment.

Each leg structure 102, 104, 106 and 108 in this example includes a respective base (such as the base 206 shown in FIG. 2B), to which the respective lift 116, 118, 120 and 122 is mounted, and a respective housing 142, 144, 146 and 148. The lifts 116, 118, 120 and 122 are each vertically adjustable and capable of supporting the work surface 126 and console equipment mounted or stored thereon. The lifts 116, 118, 120 and 122 in this example are each similar to the first lift 202 of the leg structure shown in FIGS. 2A and 2B and described below. However, embodiments are not limited to any particular type of lift or vertically adjustable support for use with the leg structures. For example, an expandable or sliding hinge and/or a pivoting member could be used to provide vertical adjustment rather than a telescoping lift. Lifts or other vertically adjustable supports described herein may be powered, automatically and/or manually adjusted or a combination thereof. In some embodiments, the vertically adjustable supports may be spring loaded. In still other embodiments, the leg structures may include static vertical supports in the place of vertically adjustable supports.

The housings 142, 144, 146 and 148 each cover the respective base and partially enclose the respective lift 116, 118, 120 and 122. The housings 142, 144, 146 and 148 are generally box shaped in the example embodiment of FIG. 1, although housings may be in other shapes or configurations in other embodiments. The housings 142, 144, 146 and 148 may also be omitted in other embodiments.

In some embodiments the leg structures each include more than one lift, as mentioned above. For example, a leg structure may include two or more spaced apart lifts mounted on a base (e.g. one in front of the other). The two or more lifts may support two or more respective work surfaces.

Figure 2A:
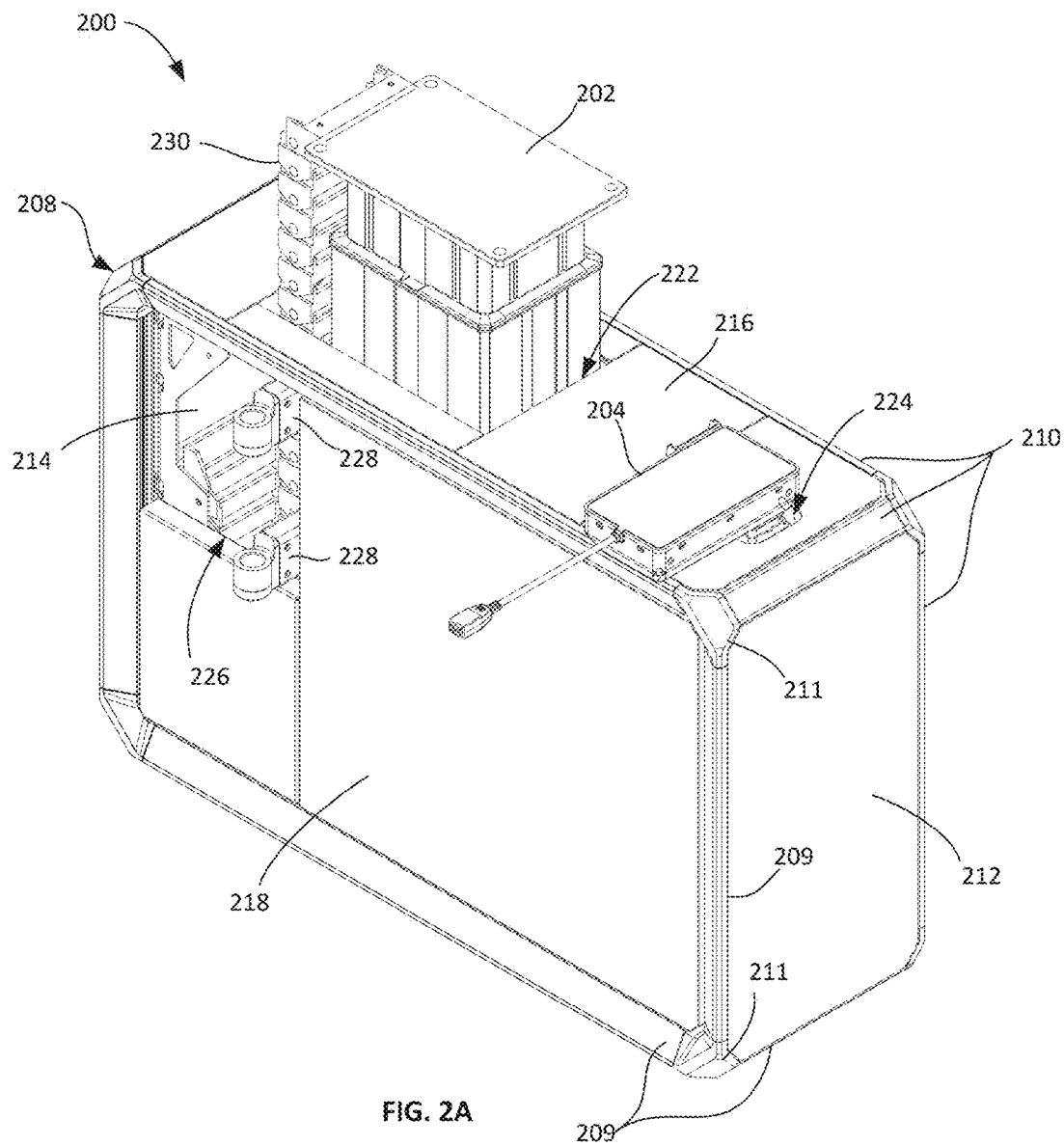
FIG. 2A is a perspective view an example leg structure for a console support structure according to some embodiments.

An example multi-lift leg structure 200 will now be described in with reference to FIGS. 2A and 2B. FIG. 2A is a perspective view of the leg structure, which includes first lift 202 and second lift 204 mounted to a base 206 (not visible in FIG. 2, but shown in FIG. 2B). The leg structure 200 also includes a housing 208 that covers the base 206 (shown in FIG. 2B) and partially encloses the first and second lifts 202 and 204. The leg structure 200 is similar to the leg structures 102 and 108 shown in FIG. 1, but with the addition of the second lift 204 (rather than having a single lift). The housing 208 is generally box-shaped in this example, although embodiments are not limited to such shapes. The housing 208 is optional, and the shape and form of the housing 208 may vary in other embodiments. The housing 208 in this example includes a box frame 210. The box frame 210 is formed of elongated frame pieces (e.g. metal extrusions) 209 that extend along edges of the box frame and are connected by corner pieces or castings 211 in this example. In other embodiments, the elongated frame pieces 209 may connect directly to one another (to form corners) and the corner pieces or castings 211 may be omitted. Any suitable frame structure for a housing may be used. Some housings in other embodiments may use connectable panels or covers in addition to or in place of a frame.

The housing 208 also includes a front cover 212, a back cover 214, a top cover 216 and two opposite side covers 218, which are all mounted to the box frame 210 as shown. The front cover 212, the back cover 214, the top cover 216, and the two side covers 218 are individually removable in this example to provide access to the lifts 202 and 204 and base 206. The covers 212, 214, 216 and 218 may also be swapped with other covers or panels (not shown) to provide additional customization. In some embodiments, the housing 208 may be entirely removable and replaceable. The covers 212, 214, 216 and 218 may be made of any suitable material including, but not limited to wood, glass, metal, composite materials, etc. Lighting elements, such as LEDs, may be included in one or more of the covers 212, 214, 216 and 218. The shape, configuration, material composition and/or look of the box frame, including the covers 212, 214, 216 and 218 may vary.

The top cover 216 defines first and second openings 222 and 224 through which the first and second lifts 202 and 204 protrude or extend respectively. The first and second lifts 202 and 204 are vertically adjustable to various heights above the housing 208.

The side covers 218 each define an opening 226 that provides clearance for a pivot connector 228. As will be explained below, the pivot connector 228 is for connecting the leg structure 200 to one or two lateral support structures (such as the lateral support structures 110, 112 and 114 shown in FIG. 1).

An optional cable management chain 230 is shown in FIG. 2A. The cable management chain 230 has a generally hollow interior that may provide a flexible conduit for guiding cables therethrough.

Figure 2B:
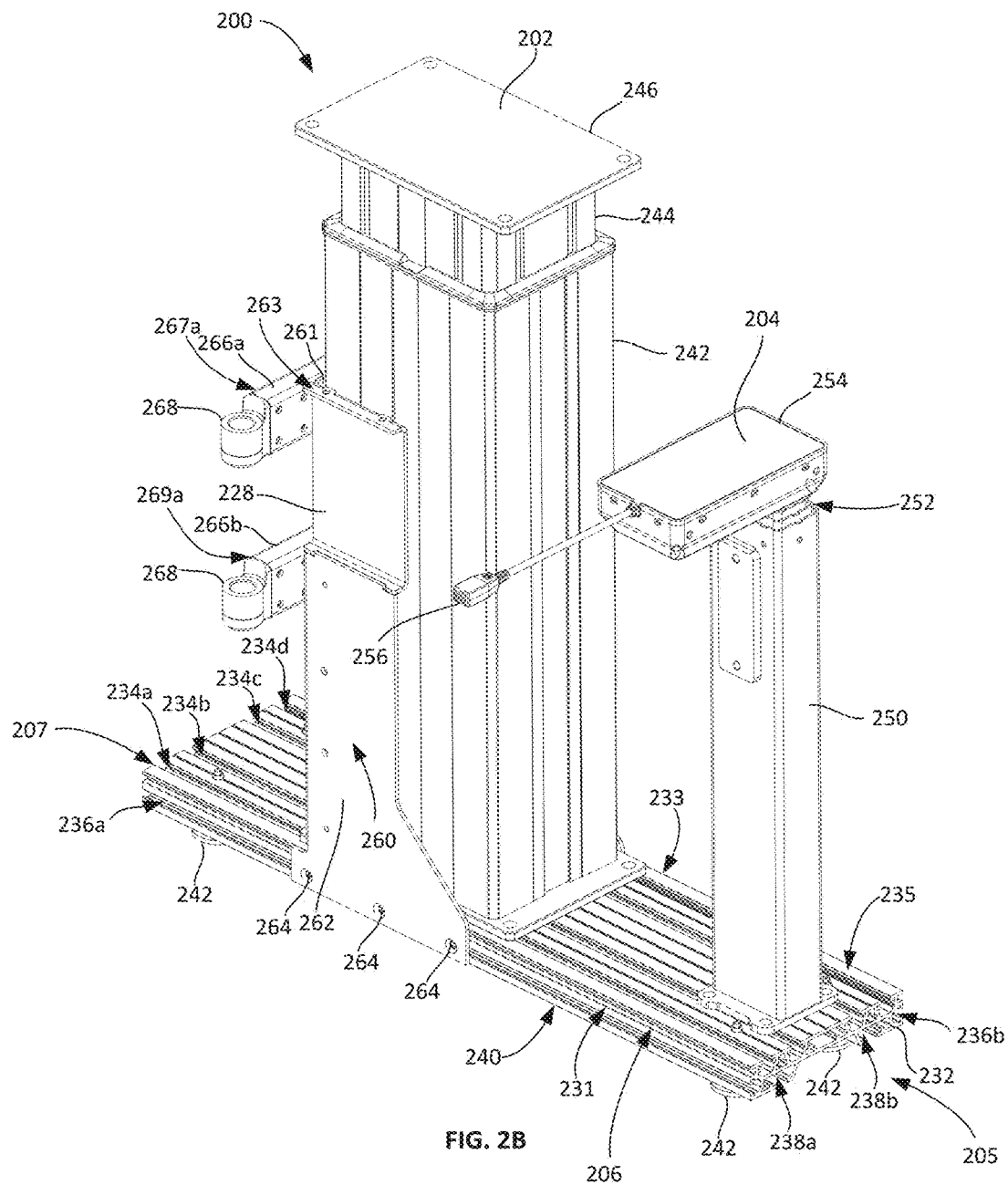
FIG. 2B is a perspective view of the leg structure of FIG. 2A, but with a housing removed.

FIG. 2B shows the leg structure 200 with the housing 208 from FIG. 2A removed such that the base 206 is visible. The base 206 and first and second lifts 202 and 204 together form a frame for the leg structure 200. The lifts 202 and/or 204 may be swapped or interchanged with other lifts of the same or different configurations.

In this example, the base 206 is elongated having a front 205, back 207, upper face 235, sides 231 and 233 and lower face 240. The base 206 in this example is an extrusion 232. The extrusion may be metal or any other suitable material. The base 206 defines multiple spaced apart, parallel ports 234a to 234d that extend along the length of the upper face 235. The ports 234a to 234d in this example are in the form of ports or grooves. The upper port 234a to 234d may receive mounting hardware (e.g. screws, bolts, strips, etc.) for mounting the lifts 202 and 204. The extrusion 232 also includes side port 236a and 236b (formed as grooves or ports in this example) along its sides 231 and 232 that may similarly receive mounting hardware. Lower ports 238a and 238b extend along the lower face 240 of the base 206. Optional feet 242 are mounted to the lower face 240. It will be understood that the base 206 is provided as an example, and embodiments are not limited thereto. Any base suitable for supporting lifts or other vertically adjustable supports may be used. Alternatively, the base may be integrated or formed integral with one or more lifts or other vertically adjustable supports. The base 206 may also have varying lengths, and in some embodiments the base 206 may extend in front or behind a console work surface to support additional equipment. See, for example, the console 2300 in FIG. 23. The base 206 may, in some embodiments, be anywhere from 2 to 4.5 feet long, although this range is provided only as an example.

As shown in FIG. 2B, the second lift 204 is spaced apart and positioned forward from the first lift 202. The first and second lifts 202 and 204 may be placed at various positions on the base 206 as needed. The upper ports 234a to 234d allow for customization of the positioning and number of lifts used. Other elements now shown may also be mounted to the upper face 235 of the base in other embodiments. In the example of FIG. 2B, the first lift 202 is mounted to outermost ports 234a and 234d, while the second lift 204 is mounted to the innermost ports 234b and 234c.

The first lift 202 in this example is a telescoping lift with a lift base 242 and a vertically adjustable telescoping actuator 244 that has an upper end in the form of a support plate 246. A first work surface (such as work surface 126 in FIG. 1) may be mounted to the support plate 246.

The second lift 204 in this example is also a telescoping style lift with a lift base 250 and a vertically adjustable telescoping actuator 252 with an upper support module 254 connected thereto. The upper support module 254 can support a second work surface. See, for example, the split work surface examples of FIGS. 15B and 21. The upper support module 254 includes an electrical connector 256.

As shown in FIG. 2B the telescoping actuator 244 of the first lift 202 has a larger horizontal cross sectional profile than the second lift 204 (almost as wide as the base 206 itself). The first lift 202 may be able to support more weight than the second lift 204. However, the particular lifts used may vary in other embodiments, and embodiments are not limited to the specific lifts 202 and 204 shown in FIG. 2B.

The leg structure 200 in this example also includes the pivot connector 228, which is mounted on the base 206. The pivot connector 228 includes a vertical section 260 and upper and lower elongated horizontal connection arms 266a and 266b mounted to the vertical section 260 and are traverse with respect to the base. The vertical section 260 generally extends upward from the base. In this example, the vertical section 260 is formed as a metal sheet (although other materials and/or forms may be used) with a back panel 261 with two side panels 262 extending forward therefrom. The vertical section 260 is sized in this example to partially wrap around the lift 202. The sides panels 262 of the pivot connector extend downward over the sides 231 and 233 of the base 206, where the sides panels 262 are attached to the sides 231 and 233 of the base by any suitable means (e.g. connecting hardware such as bolts, screws etc.). In this example, holes 264 in the side panels 262 of the pivot connector 228 are aligned with the side ports 236a and 236b and receive connection hardware to secure the pivot connector 228 to the base 206.

The upper and lower connection arms 266a and 266b are located near a top 263 of the pivot connector 228, and are thus elevated from the base 206. The connection arms 266 are spaced apart and aligned vertically and attached to the back of the vertical section 260. The connection arms 266a and 266b are extend outward past both side panels 262 of the vertical section 260. The upper connection arm 266a has opposite ends 267a and 267b. The lower connection arm 266b has opposite ends 269a and 269b. The ends 267b and 269b are not visible in FIG. 2B, but are best seen in FIGS. 4C and 4D. Pivot connectors 268 are attached to each of the ends 267a and 276b of the upper connection arm 266a and to the ends 269a and 269b of the lower connection arm 266b and to the. In this example, the pivot connectors 268 are female pivot-hinge castings, although other pivoting type connections may be used in other embodiments. The horizontal connection arms 266a and 266b are tubular and the female pivot-hinge castings 268 include extensions (not shown) that are inserted into the ends 267a, 267b, 269a and 269b of the horizontal connection arms 266a and 266b for fixed attachment thereto (by any suitable means). Other bracket types or other mounting means may be used to mount components to the leg structure 200. For example, welding, adhesives or other mounting means may be used in other embodiments.

Figure 3:
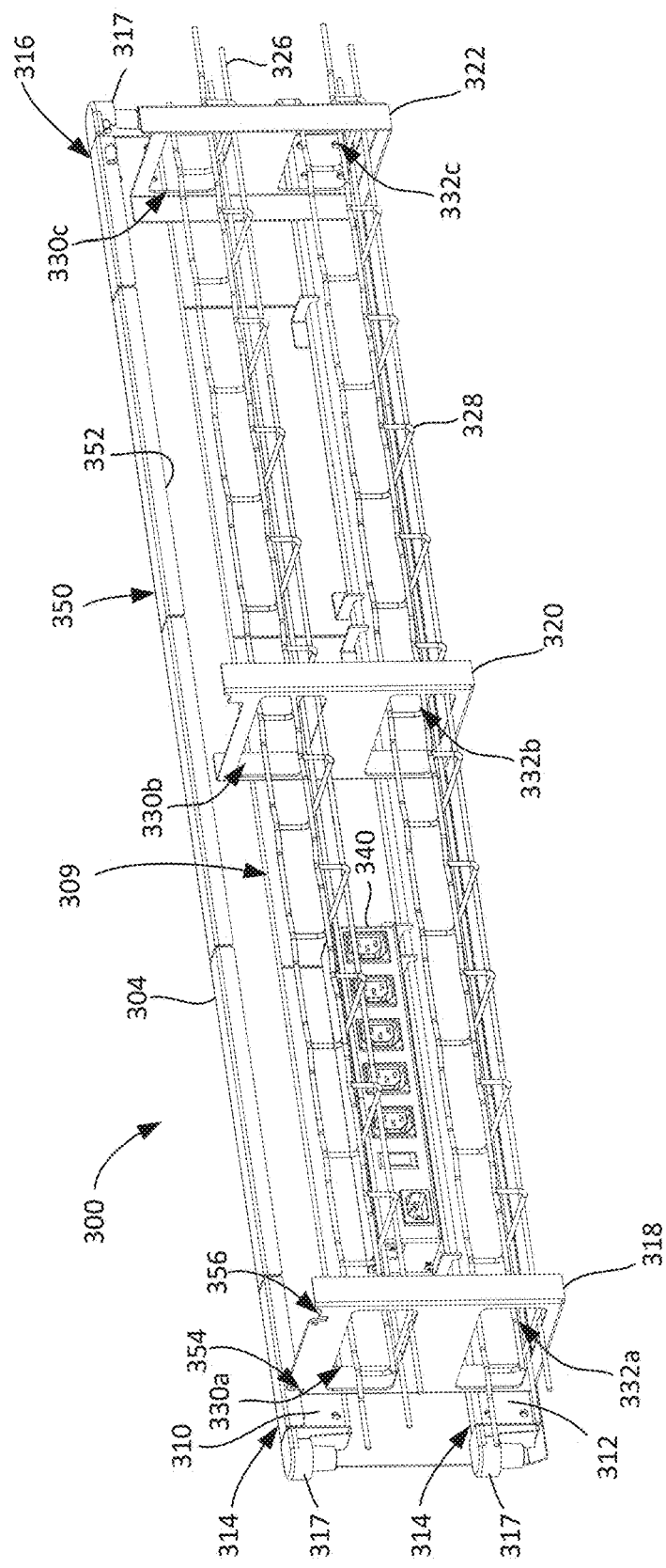
FIG. 3 is a perspective view of an example lateral support structure of a console according to some embodiments.

FIG. 3 is a perspective view of an elongated lateral support structure 300 (similar to the lateral support structures 110, 112 and 114 in FIG. 1) that may interconnect two or more leg structures (such as leg structure 200 in FIGS. 2A and 2B). Front, and top outer covers or panels are removed and not shown in FIG. 3 so that other components of the lateral support structure 300 are visible. The lateral support structure 300 may include a front outer cover and top outer cover similar to the front outer cover 302 and top outer cover 308 of the first lateral support structure in FIG. 1. The front and top outer covers are removed in FIG. 3. The lateral support structure 300 also include a back outer cover 304. In this example, the lateral support structure 300 is again duct-like structures in that it provides an interior space 309 along its length for one or more cable routing paths or raceways and/or equipment storage, as will be explained below.

As shown, the lateral support structure 300 includes upper and lower spaced apart support beams 310 and 312. The upper and lower support beams 310 and 312 are substantially horizontal and are spaced apart and aligned vertically with each other. The upper and lower support beams 310 and 312 may provide structural support for the lateral support structure 300. The support beams 310 and 312 each have opposite ends 314 and 316 to which pivot connectors 317 are attached. In this example, the pivot connectors 317 are male pivot hinge castings with extensions (not visible) inserted in the ends 314 and 316 of the support beams 310 and 312 for fixed attachment thereto. Any suitable means for attaching the pivot connectors may be used. The upper and lower beams 310 and 312 may be metal and/or may be tubular (e.g. steel tubes). Embodiments are not limited to a particular material or structure of the support beams 310 and 312.

The male pivot hinge castings 317 of the support beams 310 and 312 engage the female pivot hinge castings 268 of the pivot connector 228 shown in FIG. 2A to form pivot hinges, which may be released and disconnected by disengaging the male pivot hinge castings 317 from the corresponding female pivot hinge casting 268. Thus, the first lateral support structure 300 may be connected, at its ends, to the first and second leg structures 102 and 104 in a pivoting manner, and the relative angle of the first and second leg structures 102 and 104 with respect to the lateral support structure 300 is adjustable. The first lateral support structure 300 may instead be similarly mounted to one or more different leg structures to form various custom console configurations. In other embodiments, one or more than two support beams may be included in a lateral support structure.

The male and female pivot castings 317 and 268 may be releasable from one another, thereby forming releasable pivot hinges. Thus, the lateral support structure 300 may be quickly and easily connected to one or more leg structures by engagement and/or release of the pivot hinges. This "quick connect" functionality may allow for simply customization of the size and layout of consoles according to the present disclosure, while also possibly reducing installation time. One or more lateral support structures and leg structures may be added or removed from the console support structure, and the angle of the various sections with respect to one another may be adjusted.

With reference again to FIG. 3, a plurality of frames 318, 320 and 322 are arranged spaced apart along the length of the upper and lower support beams 310 and 312. More or fewer frames may be included in other embodiments. Each frame 318, 320 and 322 is attached to the upper and lower support beams 310 and 312 in this embodiment. The frames 318, 320 and 322 are substantially perpendicular to the support beams 310 and 312. A front outer cover (such as cover 302 in FIG. 1), a rear outer cover 304, and a top outer cover (such as the top outer cover 308 in FIG. 1) are removably attachable to the lateral support structure 300 around the peripheries of the frames 318, 320 and 322. For example, the rear outer cover 304 may attach directly to the upper and/or lower support beams 310 and 312. In FIG. 3, the rear outer cover 302 includes, along its upper edge 350, a hook-shaped lip 352 that fits over the upper support beam 310. The first frame 318 in this example defines a rear upper recess 354 and a front upper recess 356. The rear upper recess 354 receives the lip 352 of the rear outer cover 304. A similar lip (not shown) of the front outer cover 302 may be received in the front recess 356. Other configurations for mounting and attaching outer covers may also be used. The front outer cover 302, and the top outer cover 308 may be attached directly to the frames 318, 320 and 322. The covers 302, 304, and 308 may be attached in any suitable manner (e.g. screws, bolts, clips, magnets, etc.). Any suitable means for attaching outer covers may be used.

A bottom outer cover (not shown) may be included partially or fully along the bottom of the lateral support structure. The bottom of the lateral support structure 300 may be left open (without a bottom cover) to provide access and entryway for cables or other equipment to enter the lateral support section 300. For example, cables from a PC stored near or under the lateral support section may enter the lateral support section 300 through the bottom. Optionally, a bottom outer cover may be provided with one or more openings therein. The bottom outer cover may also be removable.

As shown in FIG. 3, the lateral support structure 300 includes an upper wire basket 326 and a lower wire basket 328, which are each internal to the lateral support structure 300 and extend along its length. The upper and lower wire baskets 326 and 328 may be used for routing cables (e.g. data and/or power cables) for various equipment used with the console. Each of the frames 318, 320 and 322 define respective upper openings 330a, 330b, 330c and respective lower openings 332a, 332b, 332c providing clearance and support for the upper and lower wire baskets 326 and 328. More or fewer wire baskets may be included in other embodiments. Trays, hooks, conduits or other cable management elements may be used rather than the baskets 326 and 328.

Various equipment may be mounted or stored within the lateral support structure 300. For example, power bar 340 is shown mounted within the lateral support structure 300 in FIG. 3. Other equipment may also be mounted within the lateral support structure 300 including, but not limited to, a junction box, outlets, etc.

Embodiments are not limited to the beam, frame and outer cover structure of the lateral support structure 300 shown in FIG. 3. In other embodiments, for example, the lateral support structure may be constructed using a single tubular member (e.g. large metal conduit or tube) in place of outer covers, beams and/or frames. The tubular member could include one or more cable management elements (e.g. cable baskets) and/or openings or doors for access to the interior of the tubular member.

Figure 4A:
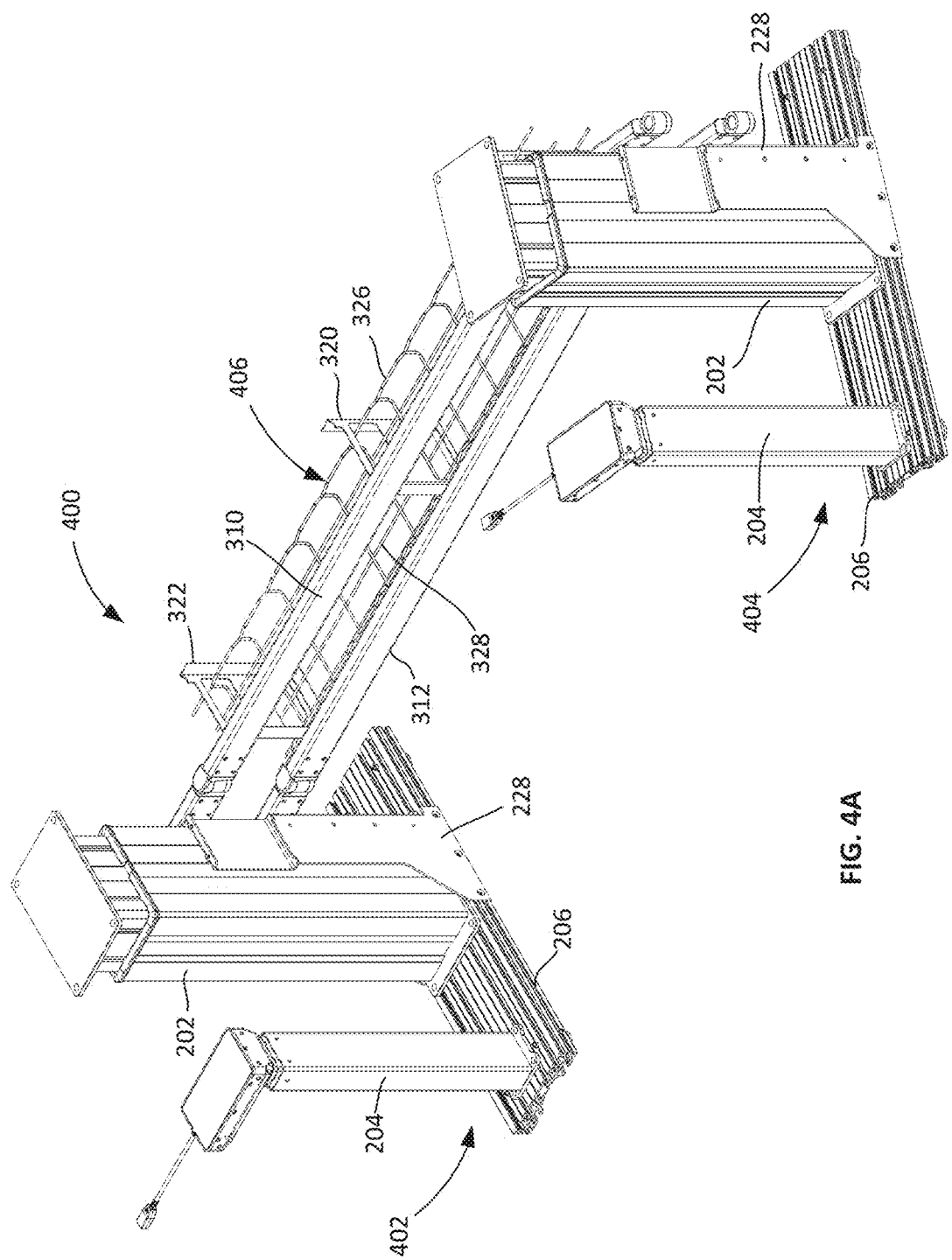
FIG. 4A is a perspective view of an example console support structure according to one embodiment.
Figure 4B:
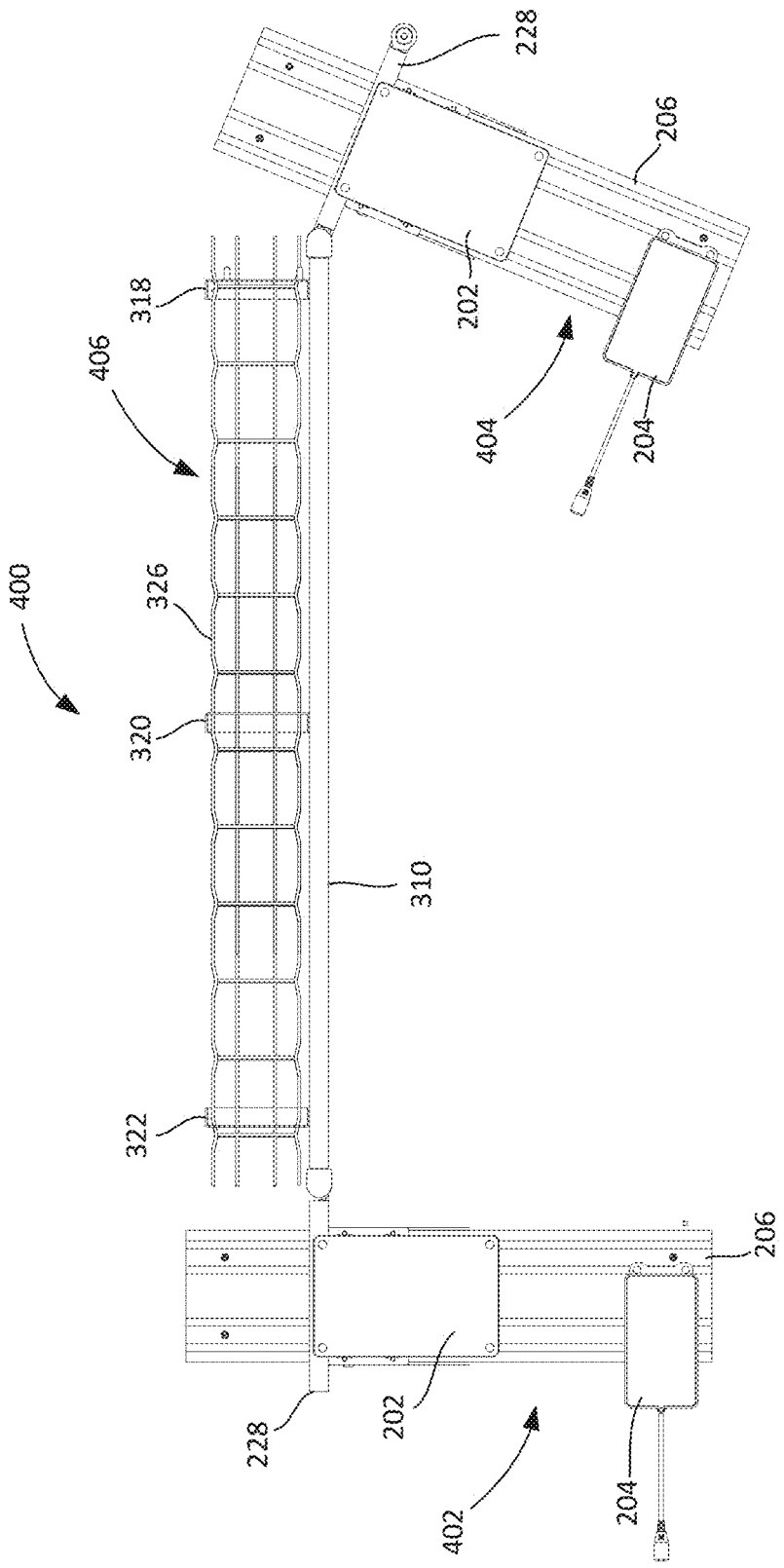
FIG. 4B is a top view of the console support structure of FIG. 4A.

FIGS. 4A to 4C show a console support structure 400 according to another embodiment. FIG. 4A is a perspective view of the console support structure 400. FIG. 4B is a top view of the console support structure 400 of FIG. 4A. FIG. 4C is a front view of the console support structure 400 of FIGS. 4A and 4B.

The console support structure 400 includes first and second leg support structures 402 and 404 and lateral support structure frame structure 406 interconnecting the first and second leg structures 402 and 404. Each leg structure 402 and 404 includes a base 206, first and second lifts 202 and 204 and pivot connector 228 (similar to the leg structure 200 of FIG. 3). A housing (such as housing 208 in FIG. 2) may optionally be included for one or more of the leg structures 402 and 404.

The lateral support structure frame structure 406 includes upper and lower support beams 310 and 312, frames 318, 320 and 322 and upper and lower wire baskets 326 and 328 (similar to the lateral support structure 300 shown in FIG. 3). Top, front and rear outer covers may be removably attached to the lateral support structure frame structure 406.

As shown, the upper and lower support beams 310 and 312 and pivot connector 228 connect to form upper and lower pivot hinges 420a and 420b, which allow adjustment of the angle between the leg structures 402 and 404 and the lateral support structure frame structure 406.

FIG. 4D is an enlarged view of the portion of the console support structure 400 within the circle marked "A" in FIG. 4C. The male pivot castings 317 of the upper and lower support beams 310 and 312 engage the respective female pivot castings 268 of the pivot connector 228 of the first leg structure 402 to form two vertically aligned pivot hinges 420a and 420b that allow horizontal pivoting. The pivot hinges 420a and 420b may be allow for easy angle customization of the console support structure and quick assembly and/or disassembly, thereby reducing installation time. The connection between the second leg structure 402 and the upper and lower support beams 310 and 312 is similar (but mirrored).

A console using console support structure 400 in FIGS. 4A to 4C may include a first work surface (not shown) mounted to and supported by the first lifts 202. A second work surface (not shown) may be mounted to and supported by the second lifts 204, thereby providing a "split" work surface configuration. Alternatively, only a single work surface may be included. In other embodiments, one or more additional leg structures may be included and interconnected by one or more additional lateral support structures, as discussed above. Work surfaces of various sizes, shapes and types may be used.

Additional outer covering, such as cladding or covers may be used to hide the pivot hinges or other connections between lateral support structures and leg structures. Turning again to FIG. 1, for example, wedge shaped covering piece 358 is shown at the intersection of the second lateral support structure 112 and the third leg structure 106. Similar wedge like coverings are used at the remaining intersections. These coverings 358 are chosen or modified based on the angle of the leg structures 102, 104, 106 and 108 with respect to the corresponding lateral support structures 110, 112, and 114. If the angle is adjusted, the coverings 358 may be modified or replaced accordingly. Any suitable covering structure may be used.

Figure 5A:
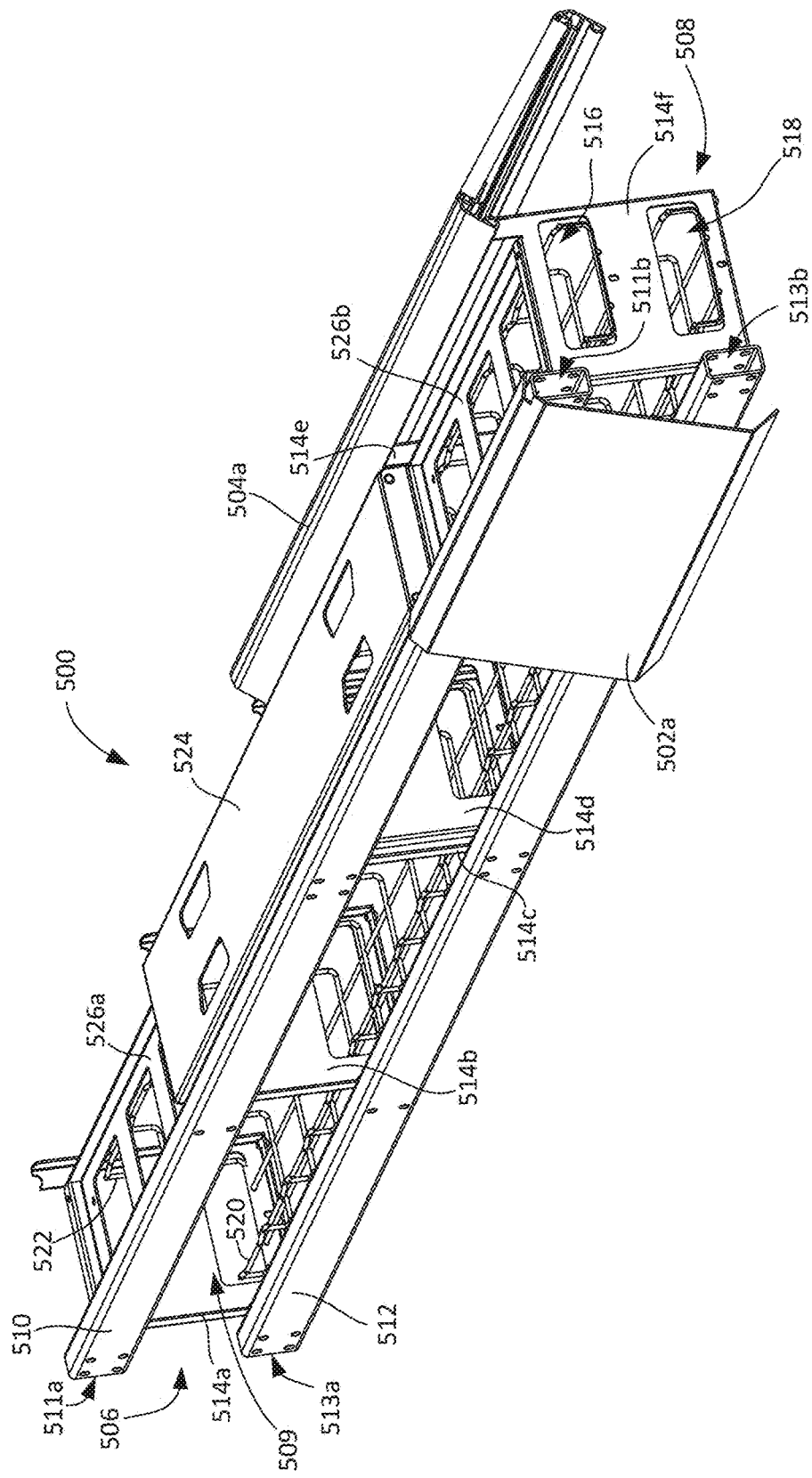
FIG. 5A is a front perspective view of a lateral support structure for a console according to another embodiment.
Figure 5B:
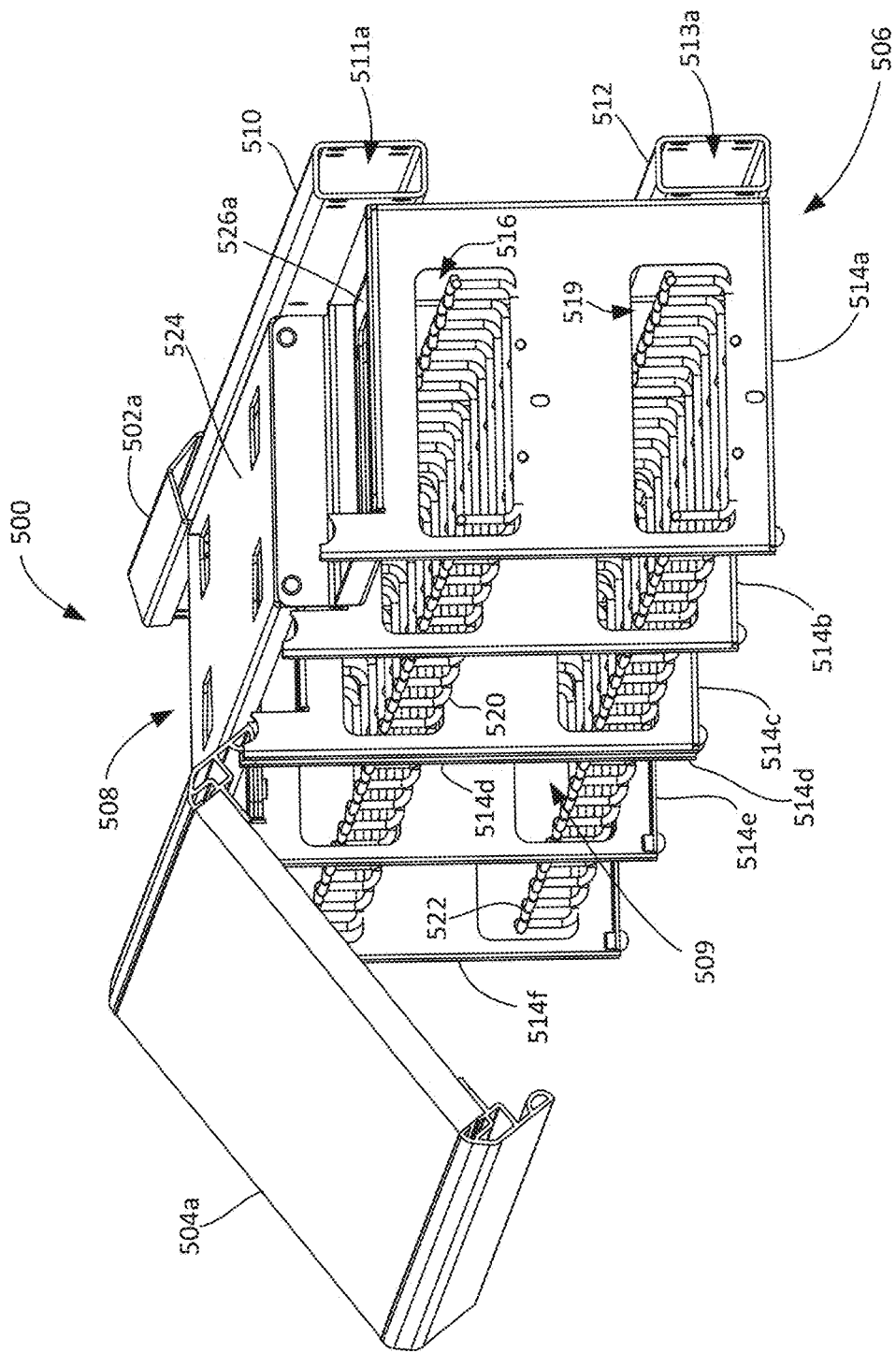
FIG. 5B is a rear-side perspective view of the lateral support structure of FIG. 5A.

Another example lateral support structure 500 according to some embodiments will now be described with reference to FIGS. 5A to 5E. FIGS. 5A and 5B are a front and rear-side perspective views, respectively, of the lateral support structure 500. In FIGS. 5A and 5B, one front outer cover 502a and one rear outer cover 504a are shown. Other front and rear covers are typically included along the length of the lateral support structure 500, but such covers are removed so that other components are visible in FIGS. 5A and 5B (see front covers 502b, 502c and 502d and rear cover 504b in FIG. 5C, for example).

As shown, the lateral support structure 500 in this example includes upper and lower support beams 510 and 512, which extend parallel horizontally and are vertically aligned with one another. Similar to the lateral support structure 300 in FIG. 3, the upper support beam 510 in FIGS. 5A and 5B is duct-like with opposite first and second ends 511a and 511b, and the lower support beam 512 is also hollow with opposite first and second ends 513a and 513b. The upper support beam includes first and second male pivot pieces 517a and 517b (shown in FIG. 5C) at its opposite ends, and the lower support beam has first male pivot piece 518a (FIG. 7A) and second male pivot piece (not shown) at its opposite ends. The male pivot pieces 517a, 517b, 518a are for connecting the lateral support structure to one or more leg structures. These male pivot pieces 517a, 517b, 518a are removed in FIGS. 5A and 5B.

The lateral support structure 500 also includes six generally rectangular, vertically oriented frames 514a to 514f, each arranged generally perpendicular to the length of the support beams 510 and 512. Two frames 514c and 514d are adjacent and positioned centrally along the length of the beams 510 and 512. The remaining frames 514a, 514b, 514e and 514f are spaced apart, with the frames 514a and 514d at opposite first and second ends 506 and 508 of the lateral support structure. The frames 514a to 514b each define respective upper and lower holes 516 and 519 to provide clearance for upper and lower cable baskets 520 and 522.

The lateral support structure also includes a removable upper cover 524. The upper cover, in this embodiment sits between the frames 514b and 514e. A first upper, horizontally oriented frame 526a extends between the vertical frames 514a and 514b (at first end 506) and a second upper, horizontally oriented frame 526b extends between the vertical frames 514e and 514f (at second end 508). The upper frames 526a and 526b are set at a lower position than the upper cover 524.

Figure 5C:
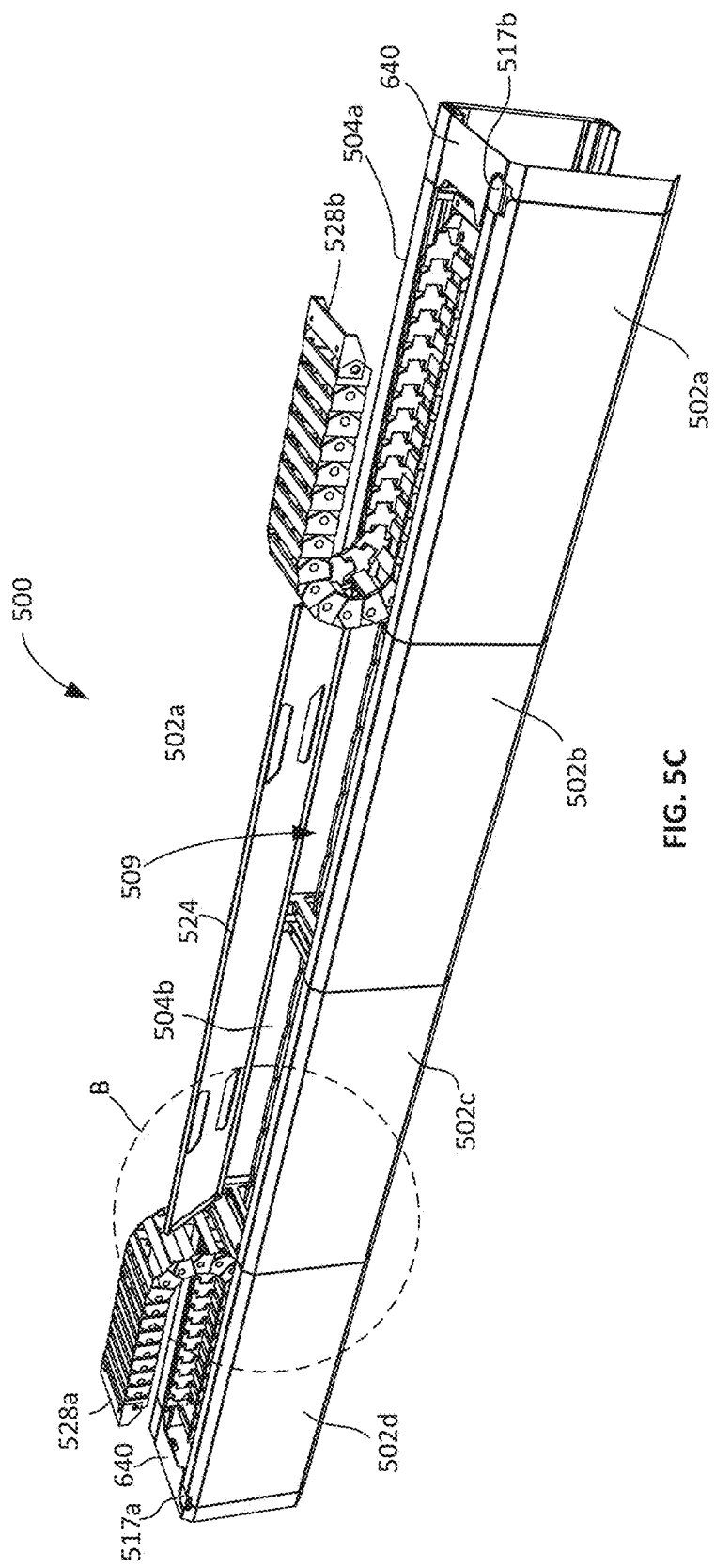
FIG. 5C is a front perspective view of the lateral support structure of FIGS. 5A and 5B with front outer covers and rear outer covers attached.

FIG. 5C is a front perspective view of the lateral support structure 500 of FIGS. 5A and 5B with front outer covers 502a to 502d and rear covers 504a and 504b attached. Optional first and second cable management chains 528a and 528b are positioned over the first and second upper frames 526a and 526b (shown in FIG. 5A). The first and second cable management chains 528a and 528b provide a cable pathway from a work surface (not shown) to the interior of the lateral support structure 500. The top outer cover 524 can pivot open, either toward the rear or front, and may also be removed completely. The removable upper cover 524 provides access to the interior of the lateral support structure 500. The front outer covers 502a to 502d and the rear outer covers 504a and 504b may also be removed to provide access to the interior of the lateral support structure. Thus, access to interior components in the lateral support structure 500 may be provided from the front, rear and/or top of the lateral support structure 500. For example, if the lateral support structure 500 is positioned against a wall preventing access via the front outer covers 502a to 502d, the rear outer covers 504a and 504b may still provide access to equipment within the lateral support structure 500.

First and second cable management chains 528a and 528b are shown having a folded over, generally horizontal arrangement. However, in other embodiments, cable management chains may be generally vertically arranged.

Figure 5D:
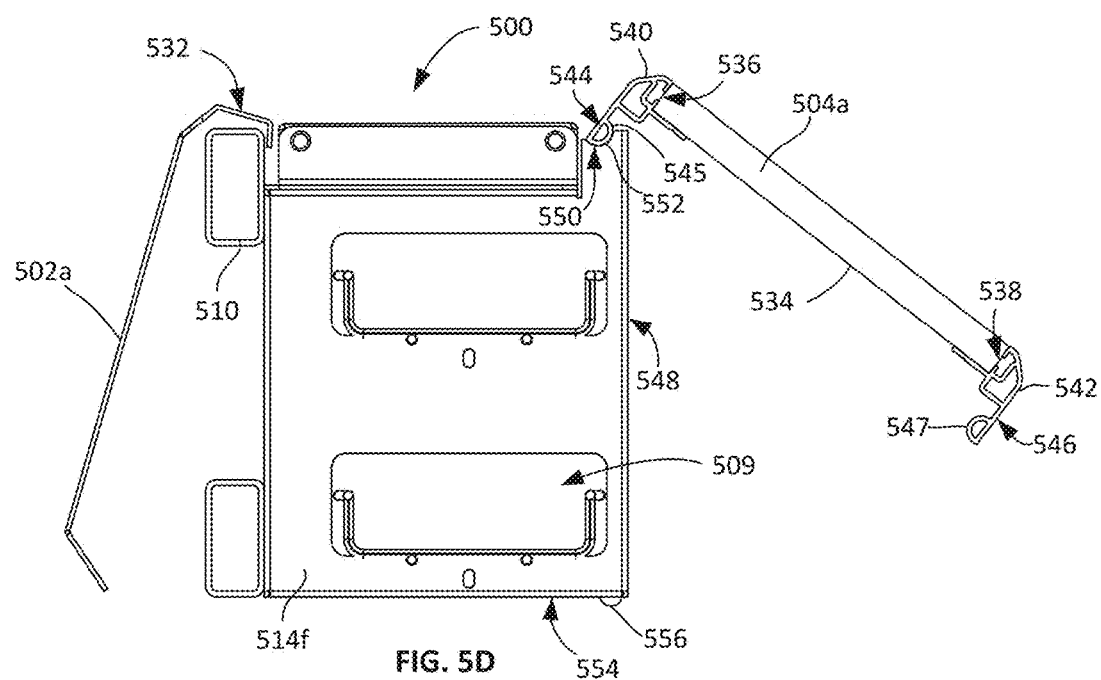
FIG. 5D is a side view of the lateral support structure of FIGS. 5A to 5C.

FIG. 5D is a side view of the lateral support structure 500 of FIGS. 5A to 5C including front outer cover 502a and rear outer cover 504a. As shown, the front outer cover 502a in this example includes a hook-shaped lip 532 that fits over the upper support beam 510 to allow the front outer cover 502a to be hung on the upper support beam 510.

Figure 5E:
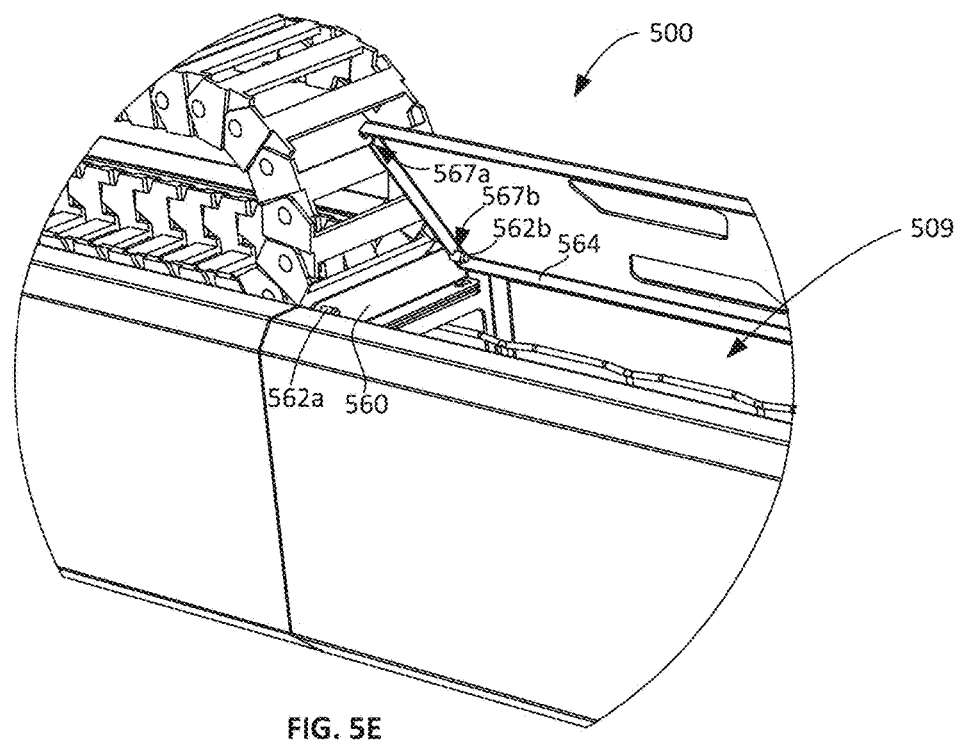
FIG. 5E is an enlarged view of the portion of the lateral support structure within the circle marked B in FIG. 5C.

FIG. 5E is an enlarged view of the portion of the lateral support structure 500 within the circle marked "B" in FIG. 5C. As shown, the frame 514b includes an upwardly extending flange section 560 with first and second pegs 562a and 562b extending horizontally therefrom. The frame 514e (shown in FIGS. 5A and 5B) includes a corresponding flange and pegs. The upper cover 524 includes a downward facing lip 564 around its periphery. The lip 564 defines concave recesses 567a and 567b that fit over the pegs 562a and 562b of the frames 514b and 514e to position the upper cover 524. Corresponding recesses (not shown) in the lip 564 sit over the corresponding pegs (not shown) on the frame 514e.

Turning again to FIG. 5D, the rear outer cover 504a includes a cover body 534 with upper and lower edges 536 and 538. Upper and lower connection strips 540 and 542 are attached over the upper and lower edges 536 and 538 of the main connection cover body 534 respectively. The upper connection strip 540 includes an upper lip section 544 that extends generally perpendicular to the cover body 534. The upper lip section 544 includes a bump or ridge 545 extending downward from the upper lip section. The lower connection strip 542 includes a corresponding lower lip section 546 with a bump or ridge 547 extending upward from the lip section. The rear outer cover 504a attaches to the frames 514e and 514f (shown in FIGS. 5A and 5B). The frame 514f is visible in FIG. 5C. As shown, the frame 514f has a rear side 548 with an upper end 550. The upper end 550 defines a recess 552 which receives the bump or ridge 545 of the upper connection strip 544. The frame 514f has a bottom 554 with a raised bump 556 positioned thereon to engage the lower connection strip 542 of the rear outer cover 504a to hold the cover body 534 in place.

Reference is again made to FIG. 5C. Similar to the lateral support structure 300 shown in FIG. 3, the lateral support structure 500 in FIG. 5C is pivotably connectable to leg structures (such as the leg structure 200 in FIG. 2A) at its opposite ends 506 and 508. In FIG. 5C, first and second male pivot pieces 517a and 517b are shown attached to ends 511a and 511b (shown in FIG. 5A) of the upper support beam 510 respectively. The third male pivot piece 518a (shown in FIG. 7A) and the fourth male pivot piece (not shown) are attached to ends 513a and 513b (shown in FIG. 5A) of the lower support beam respectively. These male pivot pieces 517a, 517b and 518a engage female pivot pieces on leg structures to form pivot hinges that allow the relative angle of the leg structures and lateral support structure 500 to be adjusted.

Figure 6:
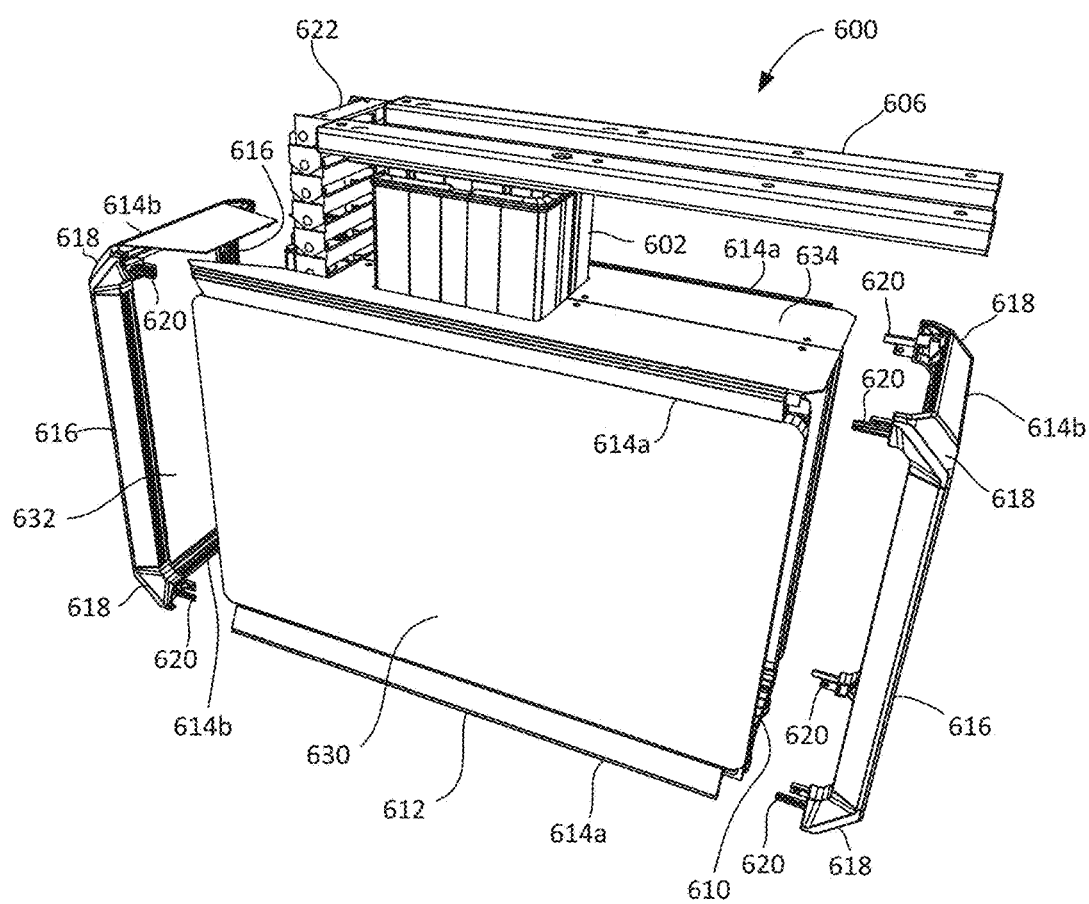
FIG. 6 is a partially exploded perspective view of a leg structure according to another embodiment.

FIG. 6 is a partially exploded perspective view of an example leg structure 600 according to some embodiments. The leg structure 600 in FIG. 6 is similar to the leg structure 200 in FIGS. 2A and 2B, but with only a single vertically adjustable lift 602. A pivot connector 604 (shown in FIG. 7A) with female pivot pieces 608a and 608b (also shown in FIG. 7A) is included for attaching the leg structure to a lateral support structure, such as the lateral support structure 500 in FIGS. 5A to 5C. The lift 602 has a two-pronged support 606 for securing and supporting a work surface (not shown).

The leg structure 600 in FIG. 6 includes a base 610 and housing 612 similar to the leg structure 200 shown in FIG. 2A. The lift 602 is mounted on the base 610 in this example. The base 610 in this example is an extrusion similar to the base 202 shown in FIG. 2B.

The housing 612 comprises lengthwise horizontal extrusions 614a, transverse horizontal extrusions 614b, and vertical extrusions 616, which are connected by corner castings 618. The horizontal extrusions 614a and 614b, the vertical extrusions 616 and the corner castings 618 form a rectangular prism shaped frame for the housing 612. The corner castings 618 include tongues 620 that are inserted into ends of the corresponding horizontal and vertical extrusions 614a, 614b, 616 and guide the castings 618 into place. The tongues 620 may include attachment means, such as a ball spring (not shown) to add force to hold the castings 618 in place when connected to the horizontal extrusions 614a and 614b and the vertical extrusions 616. The housing frame (including extrusions 614a, 614b, 616 and corner castings 618) holds front panel (not visible in FIG. 7A), side panel 630, rear panel 632 and top panel 634.

The leg structure 600 also includes a cable chain 622 similar to the cable chain 230 in FIG. 2A.

Figure 7A:
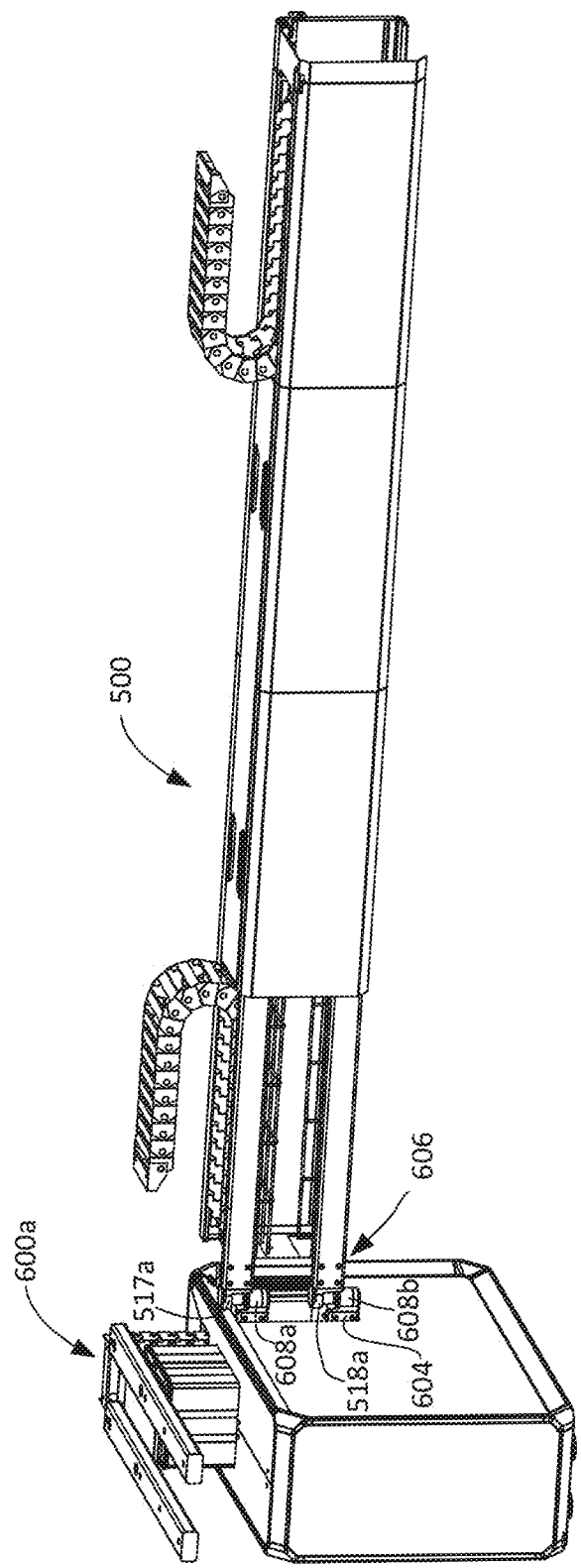
FIG. 7A is a perspective view of the lateral support structure of FIGS. 5A to 5D and the leg structure of FIG. 6.

FIG. 7A shows the lateral support structure 500 of FIGS. 5A to 5D and a first leg structure 600a similar to the leg structure 600 shown in FIG. 6. The front outer cover 502d (shown in FIG. 5C) is removed to show the connection between the lateral support structure 500 and the leg structure 600a. The leg structure 600a includes the pivot connector 604 with upper and lower female pivot pieces 608a and 608b that engage the male pivot pieces 517a and 518a of the upper and lower support beams 510 and 512, at the first end 506 of the lateral support structure 500, to form pivot hinges that are vertically aligned and allow horizontal pivoting motion. Thus, the lateral support structure 500 may pivot horizontally with respect to the leg structure 600a for adjusting the relative angle.

Figure 7B:
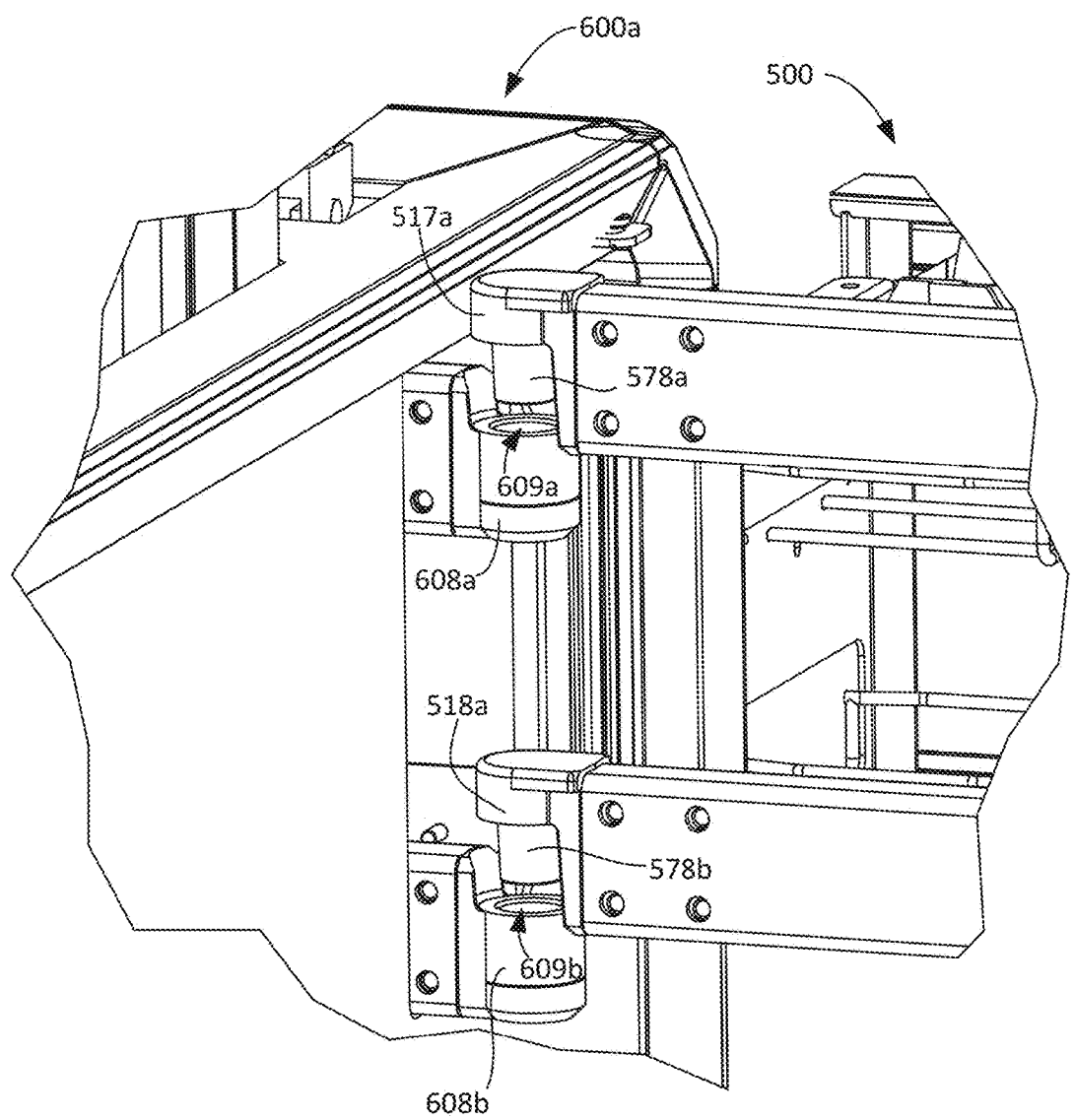
FIG. 7B is an enlarged partial view of the lateral support structure and the leg structure of FIG. 7A.
Figure 8:
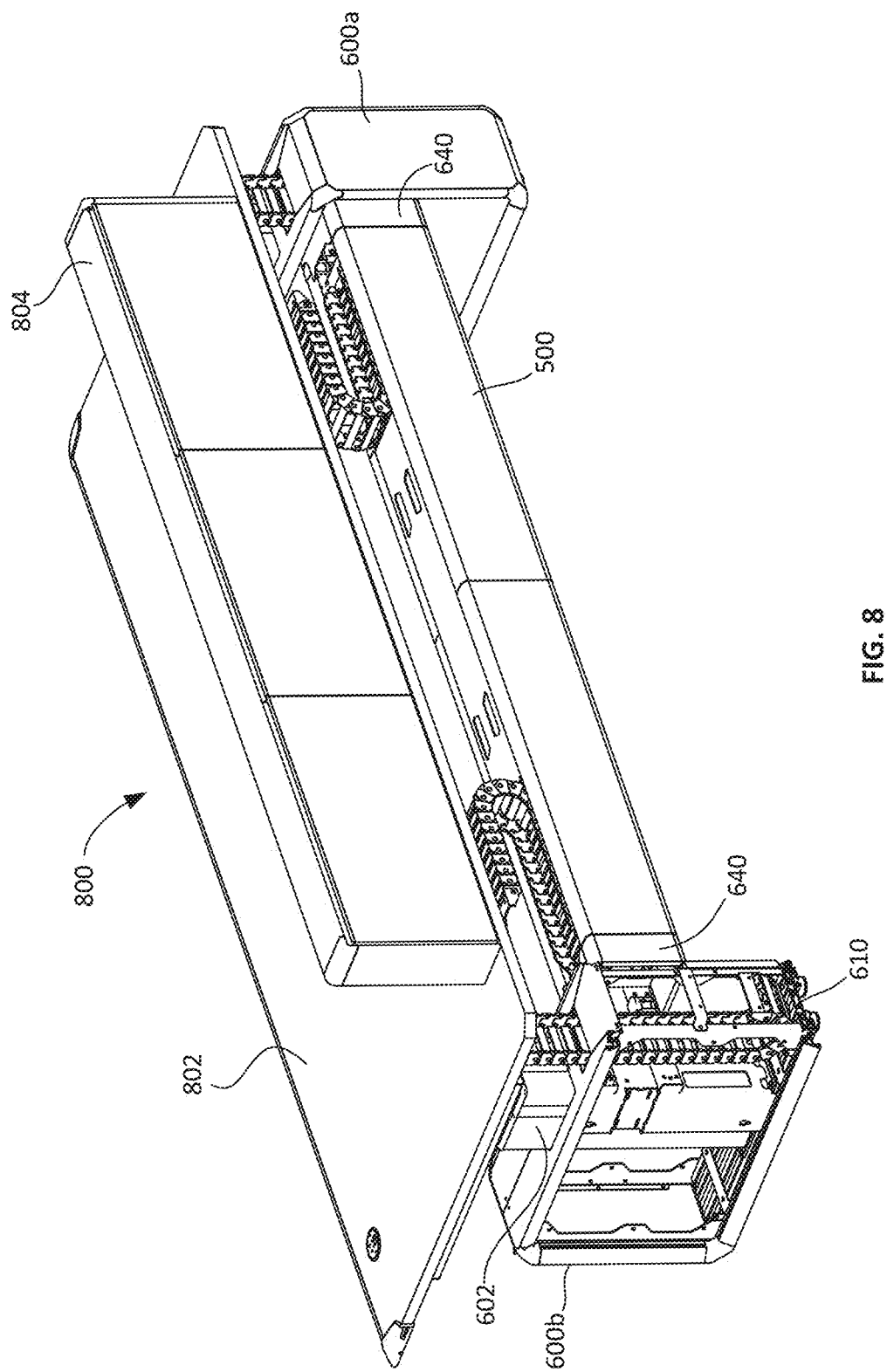
FIG. 8 is a rear perspective view of a console according to another embodiment.

FIG. 7B is an enlarged partial view of the lateral support structure 500 connected to a leg structure 600a showing how the lateral support structure 500 connects to the leg structure 600a in more detail. The male pivot pieces 517a and 518a are shown separated and unengaged from the corresponding female pivot pieces 608a and 608b. The male pivot pieces 517a and 518a include downward, columnar extensions 578a and 578b that fit into holes 609a and 609b of the female pivot pieces 608a and 608b. To connect the lateral support structure 500 to the leg structure 600a, the male pivot pieces 517a and 518a are lowered such that the columnar extensions 578a and 578b engage the holes 609a and 609b (thereby forming pivot hinges). To secure the male pivot pieces 517a and 518a to the respective female pivot pieces 608a and 608b, a bolt (not shown) may be inserted upward through the holes 609a and 609b (from the bottom) into the columnar extensions 578a and 578b. The bolt may also be tightened to fix the desired relative angle of the lateral support structure 500 and leg structure 600a. Other attachment means may also be used. FIG. 8 is a rear perspective view of a console 800 according to some embodiments. The console includes the lateral support structure 500 and the first leg structure 600a from FIGS. 7A and 7B as well as a second leg structure 600b connected to the second end 508 of the lateral support structure 500. The leg structures 600a and 600b and lateral support structure 500 together form a support structure for the console 800.

The angle of the leg structures 600a and 600b with respect to the lateral support structure 500 may be adjusted. The lateral support structure 500 and the first and second leg structures 600a and 600b form a console support structure that supports work surface 802. The work surface 802 is mounted on the lifts 602 of the leg structures 600a and 600b and is vertically adjustable. In this example, an optional slat wall 804 is mounted to the work surface 802. The rear panel 632 and side panel 630 of the leg structure 600a is removed in FIG. 8, and the base 610 is visible.

Covers 640 are included on the lateral support structure 500 at the ends of the lateral support structure 500 (also shown in FIG. 5C). The covers 640 are shaped to fit the angle of the leg structures 600a and 600b and may be replaced or adjusted as needed based on the angle, similar to the covers 358 shown in FIG. 1. Any suitable cover such as a panel, covering or cladding may be used. Alternatively, covers 640 may be omitted.

The console 800 may include storage compartments or enclosures of various sizes, shapes and configurations. Such compartments may be attached to the support structure (lateral support structure 500 and/or the first and second leg structures 600a and 600b). The storage compartment(s) may include the "thin client" storage compartment 132, 134 or 136 from FIG. 1. Additional examples of storage compartments will now be described with reference to FIGS. 9 to 11B.

Figure 9:
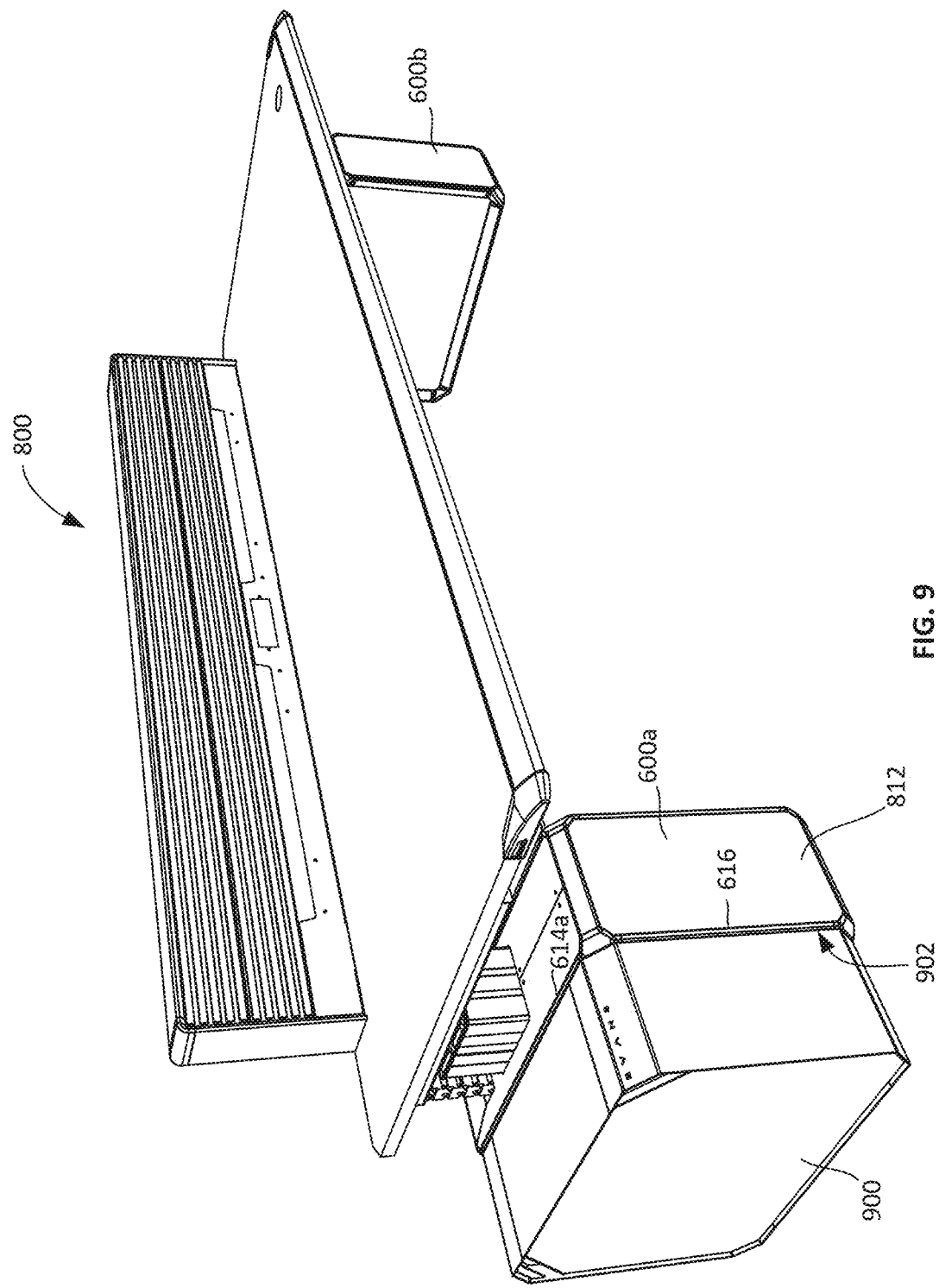
FIG. 9 is a front perspective view of the console of FIG. 8, further including an example storage compartment.

FIG. 9 is a front perspective view of the console 800 from FIG. 8, further including an example storage compartment 900. The storage compartment 900 is generally box shaped and similar in shape to the housing 812 on the leg structure 600a. The storage compartment 900 is removably connected to the outer side 902 of the leg structure 600a. Any suitable connection means (clips, bolts, etc.) may be used to secure the storage container 900 to the console 800. For example, the compartment 900 may be bolted to the frame (horizontal extrusions 614a and vertical extrusions 616) of the housing 612. One or more levelers may be included on the bottom (not shown) of the compartment 900 such that the compartment 900 sits at the appropriate height for connection to the leg structure. The storage compartment 900 is sized to be able to store computer hardware, such as a desktop computer tower (not shown) therein. Other hardware or equipment may also be stored within the compartment 900. The compartment may include one or more doors, removable covers or other openings (not shown) to provide access to the interior of the compartment. Any suitable means for providing access to the interior of the compartment 900 may be used. The compartment 900 may have wheels (not shown) to allow it to be rolled into position for connection to the leg structure 600a. The storage compartment 900 may also include vents for heat ventilation and air circulation.

The compartment 900 in FIG. 9 is sized for a single PC-type computer. However, compartments in other embodiments may be sized larger (e.g. wider) to hold two or more such computers.

Figure 10:
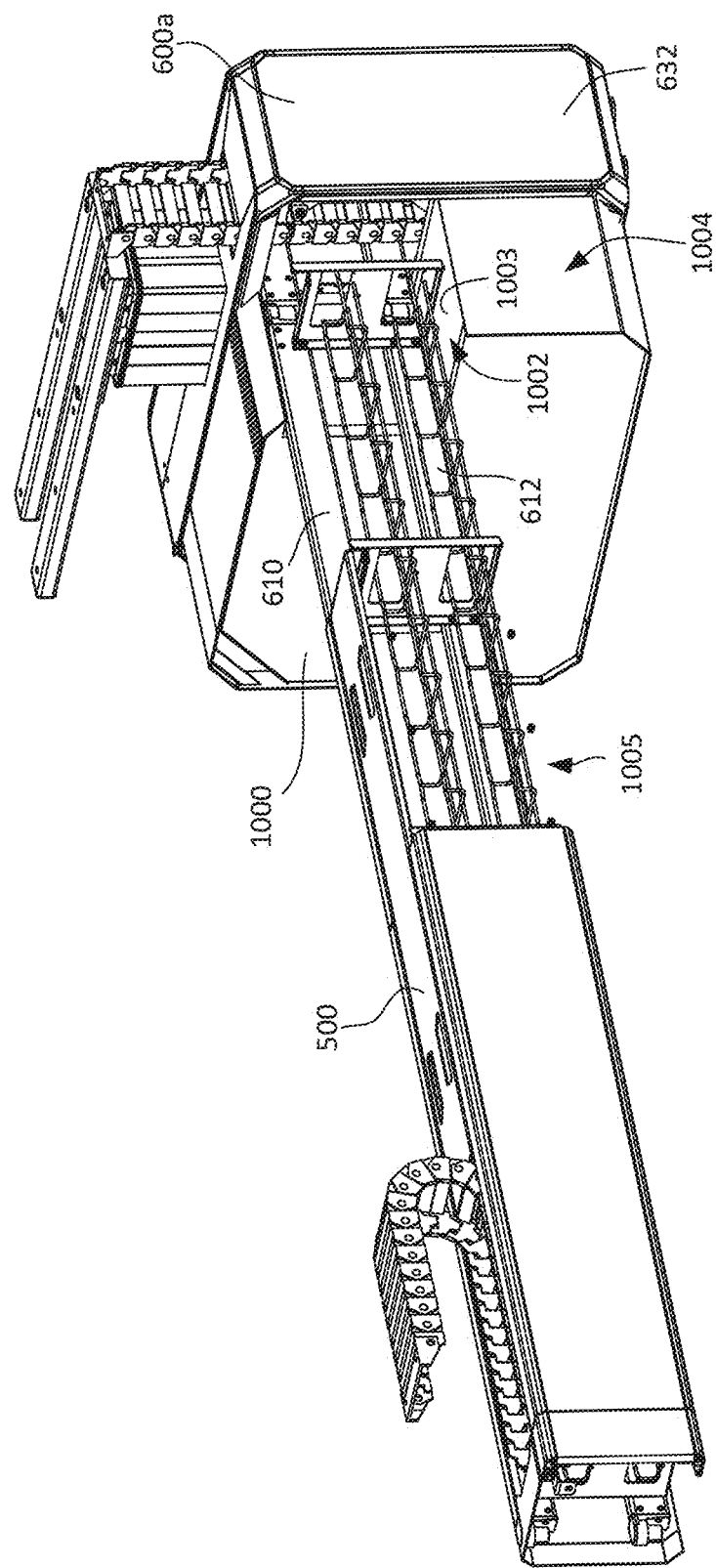
FIG. 10 is a rear perspective view of the of lateral support structure of FIGS. 5A to 5D and the leg structure of FIG. 6 together with another example storage compartment.

FIG. 10 is a rear perspective view of the lateral support structure 500 and first leg structure 600a and another example storage compartment 1000 according to some embodiments. The rear cover 504b (shown in FIG. 5C) of the lateral support structure 500 is removed to provide a better view of the storage compartment 1000. The storage compartment 1000 in FIG. 10 is similar to the storage compartment 900 in FIG. 9. However, the storage compartment 1000 in FIG. 10 connects to the lateral support structure 500. The storage compartment 1000 defines a recess 1002 in its rear face 1004 that is sized to receive the lateral support structure 500 such that the rear face 1004 is approximately flush with the rear panel 632 of the leg structure. Any suitable means for connecting the storage compartment 1000 to the lateral support structure 500 may be used including, but not limited to, clips, bolts, etc. For example, the compartment 1000 may be bolted directly to the upper support beam 510 and/or lower support beam 512 of the lateral support structure 500.

The recess 1002 in this example includes an open face 1003 for allowing cables or other equipment to pass from the storage compartment 1000 into the lateral support structure 500. The lateral support structure 500 has an open bottom 1005 through which such cables/equipment may enter the lateral support structure 500. In other embodiments the lateral support structure 500 may include a bottom cover (not shown), possibly with one or more openings.

The storage compartment 1000 may be placed at various positions along the length of the lateral support structure 500. The storage compartment 1000 may include wheels (not shown) and/or levelers (not shown) on its bottom to assist in placement of the storage compartment 1000. Additional similar or different storage compartments may also be included. As mentioned above, the size and configuration of the storage compartments described herein may vary.

The embodiments shown in FIGS. 1, 9 and 10 may be considered "open" because the space between leg structures on such consoles is substantially open. In other embodiments, the storage compartments may occupy most or all available space between the leg structures and lateral support structure(s). Such embodiments are referred to herein as "closed" configurations. One example closed configuration is shown in FIGS. 11A and 11B.

Figure 11B:
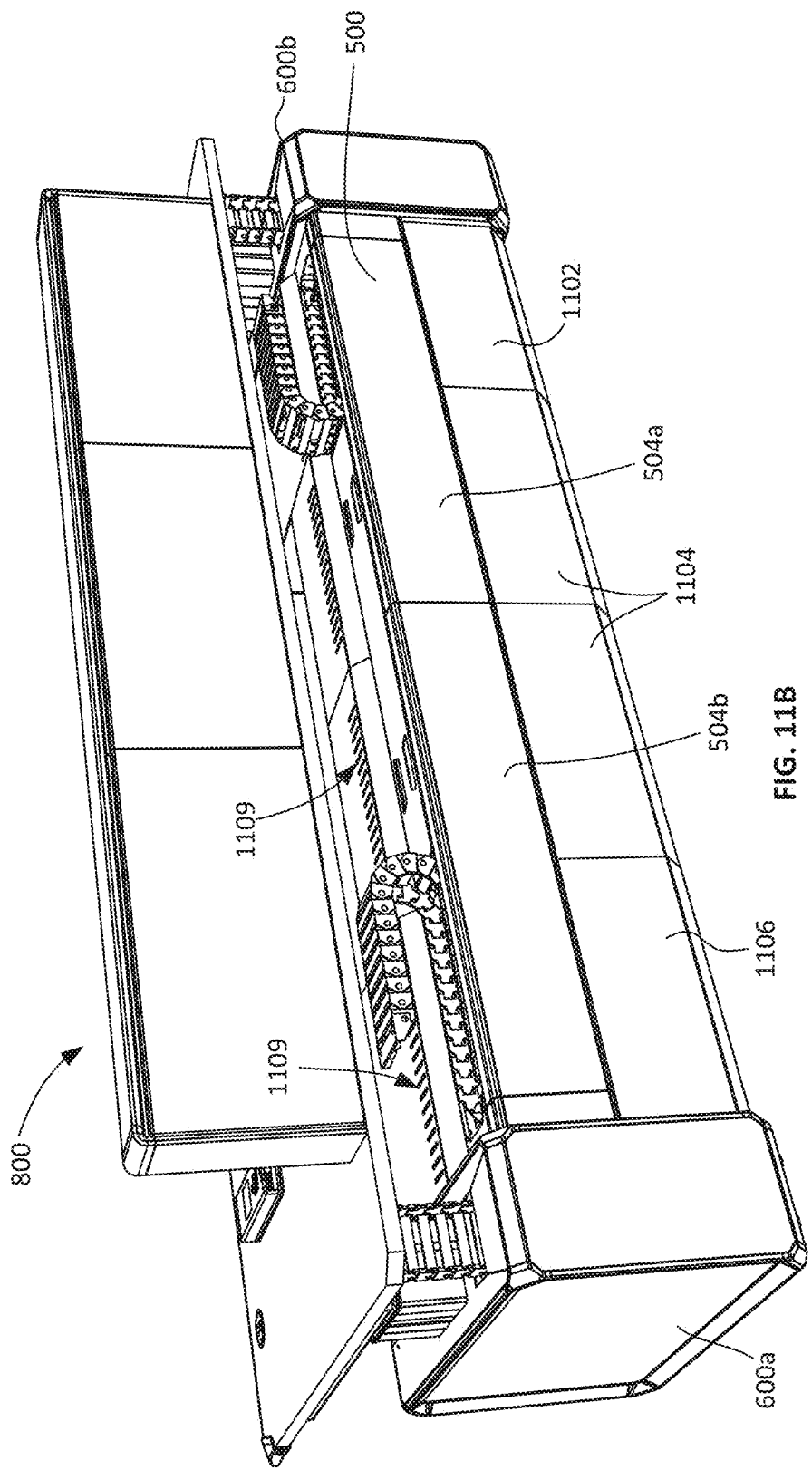
FIG. 11B is a rear perspective view of the console of FIG. 11A.

FIGS. 11A and 11B are front and rear perspective views, respectively, of the console 800 of FIG. 8, further including first, second and third storage compartments 1102, 1104 and 1106. The first and third storage compartments 1102 and 1106 may be referred to as "full depth" and the second storage compartment 1104 may be referred to as "reduced depth", where the term "depth" refers to the front-to-back direction. The depth of the first and third storage compartments 1102 and 1106 approximately matches the length of the leg structures 600a and 600b, and this depth may be sufficient to store at least one PC computer tower. One or more PC computer tower may also be stored in a sideways orientation in the reduced depth storage compartment 1104. If two or more computers are in the second compartment 1104, they may be placed front to back (parallel). If two or more computers are in the first and third storage compartments 1102 and 1106, the computers may be placed side-by-side. The number and orientation of computers stored in the first, second and third storage compartments 1102, 1104 and 1106 may vary. Other equipment may also be stored therein. Optional shelves or interior space dividers may also be included within the first, second and/or third storage compartments 1102, 1104 and 1106.

The first, second and third storage compartments 1102, 1104 and 1106 have optional vents 1109 for heat venting and air circulation. Fans (not shown) to vent the air may be included under the vents 1109. A person skilled in the art will appreciate that various openings/vent configurations may be used. Each of the first, second and/or third storage compartments 1102, 1104 and 1106 may include doors, removable elements or other openings (not shown) for providing access to their respective interiors. For example, the front covers 1110, 1112 and/or 1114 (FIG. 11A) of the first, second and/or third storage compartments 1102, 1104 and 1106 may be hinged and/or removable. Any suitable method for providing access to equipment in the compartments may be used. Openings may also be provided for cables.

As shown in FIG. 11B, each of the first, second and third storage compartments 1102, 1104 and 1106 has a side profile similar to the storage compartment 1000 of FIG. 10, in that they are shaped complementary to the lateral support structure 500 and are near to flush with the rear outer covers 504a and 504b of the lateral support structure 500. The second (partial depth) storage compartment 1104 is similarly shaped to fit with the lateral support structure.

The first and third storage compartments 1102, 1104 and 1106 may include wheels (not shown) to allow them to be wheeled into position. They may also be secured to the lateral support structure by any suitable means. For example, the first, second and third storage compartments 1102, 1104 and 1106 may each be clipped to one or both of the upper and lower support beams 510 and 512 (shown in FIG. 5A) of the lateral support structure 500. The first, second and third storage compartments 1102, 1104 and 1106 may also be removed. Various combinations and configurations of the storage means described herein may be used.

Figure 12A:
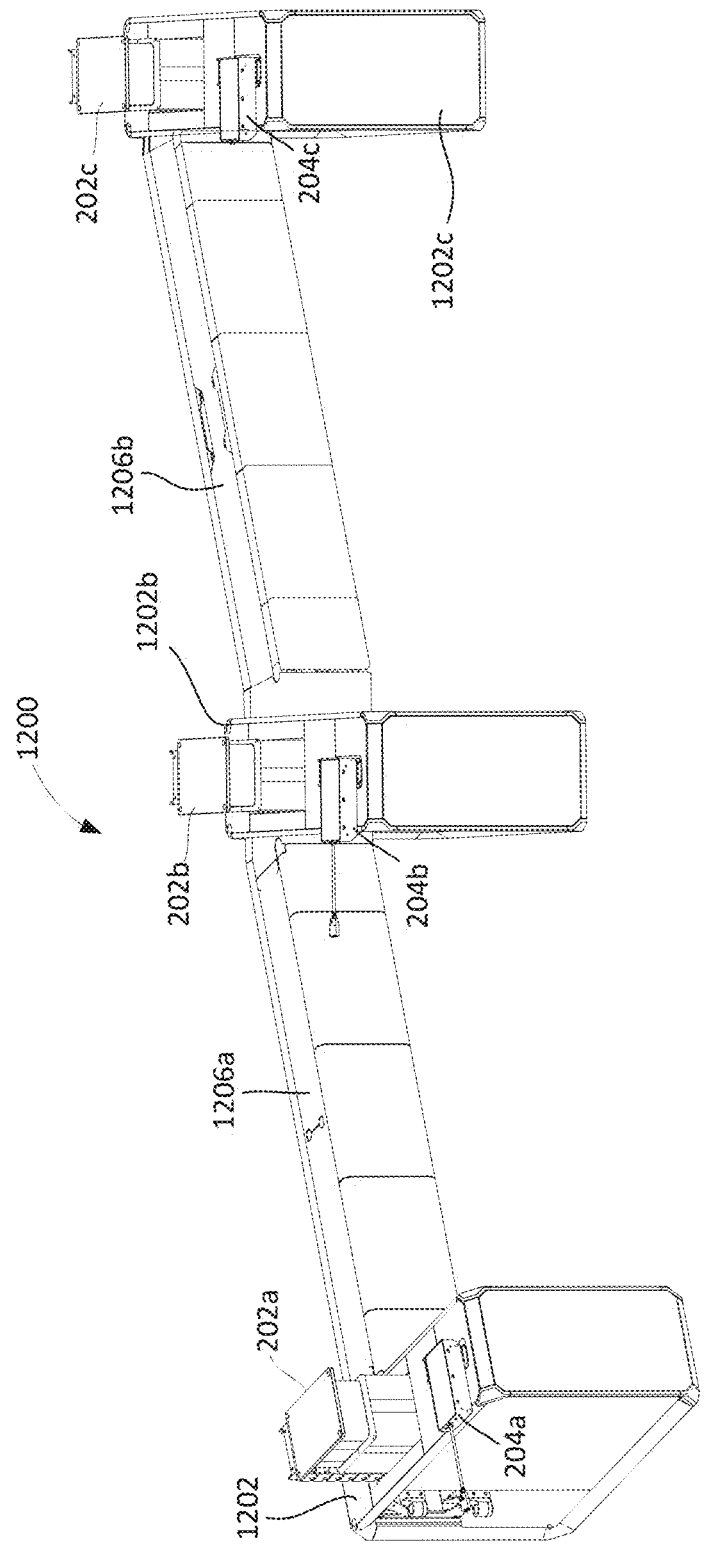
FIG. 12A is a partial perspective view of an example console support structure according to yet another embodiment.
Figure 12B:
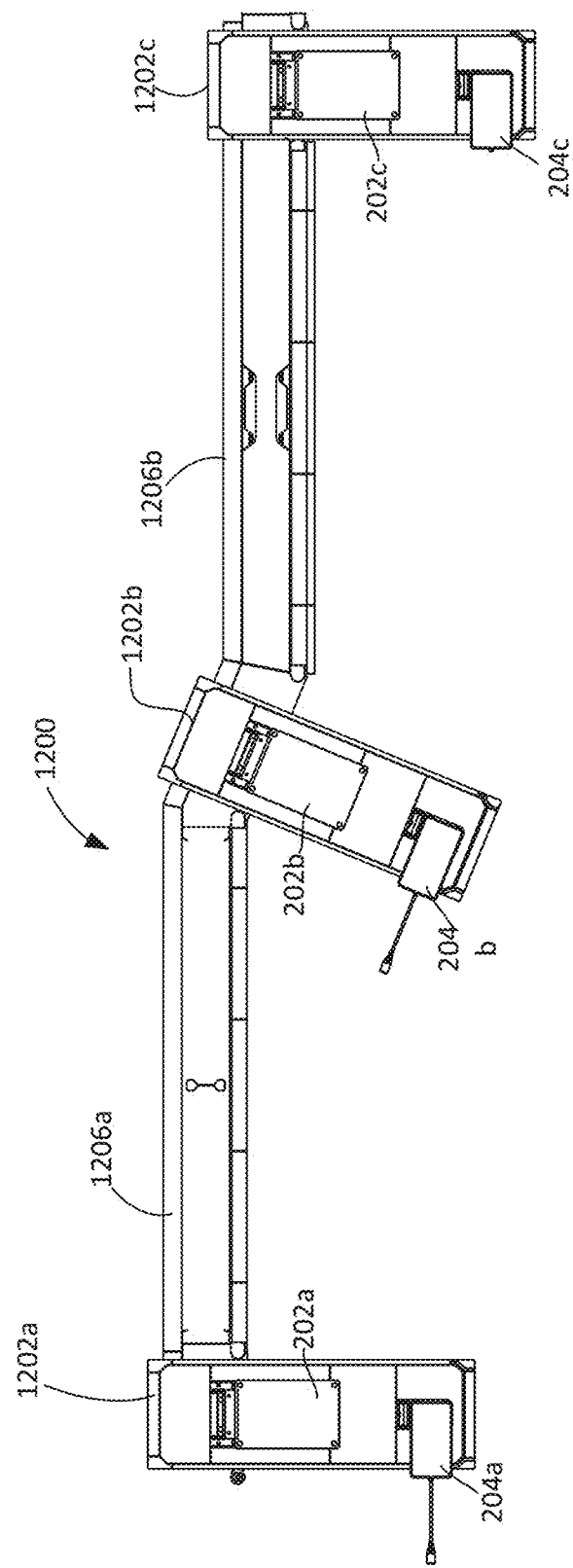
FIG. 12B is a top view of the console of FIG. 12A.

FIG. 12 is a partial perspective view of a console support structure 1200 according to yet another embodiment. FIG. 12B is a top view of the console 1200 of FIG. 12A. The console 1200 includes first, second and third leg structures 1202a, 1202b and 1202c (each the similar to the leg structure 200 of FIG. 2A) and first and second lateral support structures 1206a and 1206b (each similar to the lateral support structure 300 shown in FIG. 3). The first lateral support structure 1206a interconnects the first and second leg structures 1202a and 1202b. The second lateral support structure 1206b interconnects the second leg structure 1202b and the third leg structure 1202c. The hinged connections of the leg structures 1202a, 1202b and 1202c with the lateral support structures 1206a and 1206b allows customization of the relative angles of the leg structures 1202a to 1202c and the lateral support structures 1206a and 1206b. Forward and reverse corners may be implemented.

The console support structure 1200 may support a first one or more work surfaces (not shown) mounted to the first lifts 202a to 202c of the leg structures 1202a to 1202c. A second one or more work surfaces (not shown) may be mounted to and supported by the second lifts 204a to 204c of the leg structures 1202a to 1202c. Thus, the console support structure 1200 may provide a "split" work surface console configuration. Alternatively, only a single work surface may be included. Work surfaces of various sizes, shapes and types may be used.

Examples of some alternate leg structure configurations will now be described with reference to FIGS. 13A to 13C. FIG. 13A is a perspective view of a leg structure 1300 according to one embodiment having a lift 1302 attached to a base 1306 (similar to the leg structures 102, 104 and 106 in FIG. 1). The lift 1302 in FIG. 13A is the same as the first lift 202 in FIGS. 2A and 2B.

FIG. 13B is a perspective view of a leg structure 1310 according to another embodiment having the same first lift 131304a and an additional second lift 131304a spaced apart and arranged on the base 1306 (similar to the leg structure 200 of FIGS. 2A and 2B). The second lift 1304 in FIG. 13B is the same as second lift 204 in FIGS. 2A and 2B.

FIG. 13C is a perspective view of a leg structure 1320 according to another embodiment that is similar to the leg structure 200 in FIGS. 2A and 2B, and with the first and second lifts 1302 and 131304. However, the first and second lifts 1302 and 1313 are spaced further apart than in FIG. 2A. The lifts 1302 and 1304 (or other vertically adjustable supports) on the base 1306 may be mounted in various positions on the base 1306 and with variable spacing to accommodate different work surface layouts. In some embodiments, more than two lifts or other vertically adjustable supports may be mounted on the base 1306.

The leg structures 1300, 1310 and 1320 in FIGS. 13A to 13C may each further include a housing or other cladding or enclosure. For example, housings similar to the housing 208 in FIG. 2A may be used.

FIGS. 14A to 14D illustrate additional examples of housings for leg structures described herein. FIG. 14A is a perspective view of a leg structure 1400 according to one embodiment. The leg structure 1400 includes a single lift 1402 (same as the first lift 202 of FIGS. 2A and 2B) attached to a base (not shown). The base may be similar to the base 206 of FIG. 2B, for example. The leg structure 1400 has an enclosure or housing 1404 that covers the base and partially encloses the lift 1402. The housing 1404 includes a base frame section 1406 with a rear 1407 and front 1409 that covers the base. The housing 1404 also includes a loop frame section 1408 that extends upward from the base frame section 1406, extending from the rear 1407 and only part way toward the front 1409, thereby forming a sideways "P" shaped frame for the housing 1404. The base frame section 1406 of the housing 1404 hides the base of the leg structure 1400 (to which the lift 1402 is mounted). Opposing side panels 1410 fit within and close off the loop section 1408.

FIG. 14B is a perspective view of a leg structure 1420 according to another embodiment. The leg structure 1420 includes the lift 1402 and base (not shown) from the leg structure 1400 of FIG. 14A. The leg structure 1420 of FIG. 14B has a housing 1422, which again forms a sideways "P" shape that covers the base and partially encloses the lift 1402. The housing has a base section 1424 and a lift enclosing section 1426.

FIG. 14C is a perspective view of a leg structure 1440 according to yet another embodiment. The leg structure 1440 includes the lift 1402 and base (not shown) from the leg structure 1400 of FIG. 14A. The leg structure 1440 includes an enclosure or housing 1442 comprising a rectangular loop frame 1444 with an interior 1445. The loop frame 1444 forms a top 1446, bottom 1448, front 1450 and back 1452 of the housing 1442. A first side panel 1454, a mirrored and opposite side panel (not shown) and an intermediate panel 1456 together partially close of the interior 1445 of the loop frame 1444 (including the lift 1402). Alternatively, in another embodiment, two opposing side panels could fully or substantially enclose the interior 1445 of the loop 1444.

FIG. 14D is a perspective view of a leg structure 1460 according to still another embodiment. The leg structure 1460 includes the lift 1402 and base (not shown) from the leg structure 1400 of FIG. 14A. The leg structure 1460 further includes a second lift 1404, similar to the second lift 204 in FIGS. 2A and 2B. The leg structure 1460 further includes a housing 1462. The housing 1462 is similar to the housing 1442 of FIG. 14C in that it comprises a rectangular-loop frame 1464. The housing 1462 in FIG. 14D includes a first side panels 1466 and an opposite (mirrored) side panel (not shown) attached. These side panels 1466 fill and fit within the inner surface of the loop frame 1464 to form a fully closed space within the loop frame 1464.

Figure 15A:
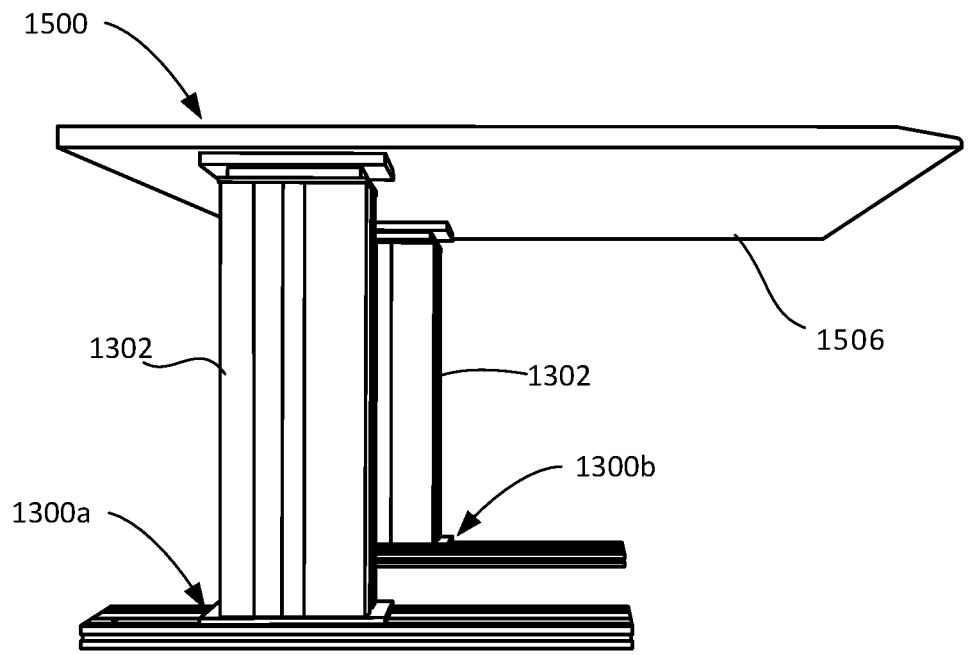
FIG. 15A is a side view of an example console supporting a single work surface according to one embodiment.
Figure 15B:
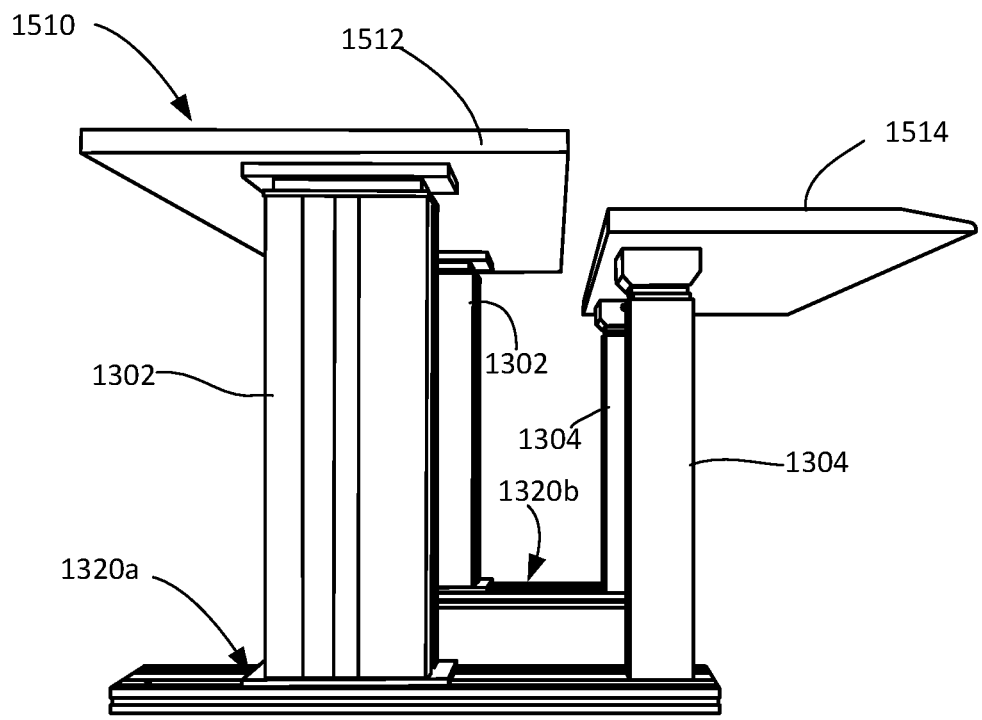
FIG. 15B is a side view of an example console supporting split work surfaces according to one embodiment.

FIGS. 15A and 15B show examples of consoles and work surfaces that may be supported by consoles according to some embodiments. FIG. 15A is a side view of an example console 1500 that includes two spaced apart leg structures 1300a and 1300b, each similar to the leg structure 1300 from FIG. 13A, and each having a respective lift 202. The lifts 202 support a single work surface 1506 near opposite ends thereof.

FIG. 15B is a side view of an example "split" surface console 1510. The console 1510 includes two spaced apart leg structures 1320a and 1320b, each similar to the leg structure 1320 from FIG. 13C and having the respective first and second lifts 202 and 204. The first lifts 202 are connected to and support a first work surface 1512 near opposite ends thereof, and the second lifts 204 are connected to and support a second work surface 1514 near opposite ends thereof. Various different shapes, sizes and types of work surfaces may be supported by various types of lifts or other vertically adjustable supports, and embodiments are not limited to the particular example arrangements shown in the figures.

The consoles 1500 and 1510 shown in FIGS. 15A and 15B do not include a lateral support structure between the respective pairs of leg structures 1300a/1300b and 1320a/1320b. The leg structures 1300a, 1300b, 1320a and 1320b also do not include housings or enclosures. However, other embodiments may include one or more lateral support structures and/or one or more housings or enclosures.

The various example consoles described herein may provide customizable and/or easily assembled storage spaces for various equipment used with the console such as computer hardware, cables, displays, office supplies, etc. One or more enclosures and/or one or more panels that form storage compartments may be mounted on the console support structures described herein. As discussed above, the consoles described herein may thus provide both "open" and "closed" configurations.

Figure 16:
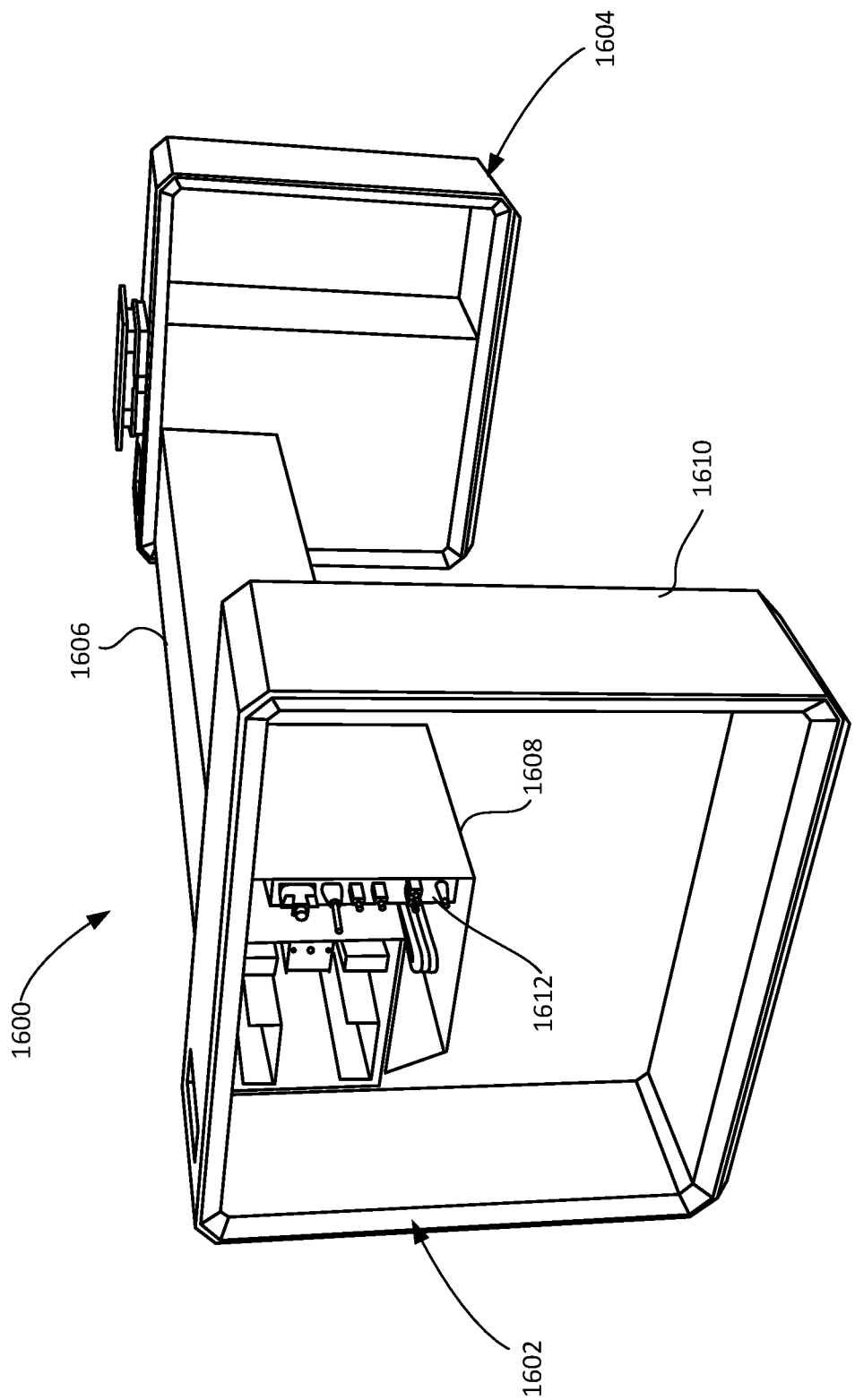
FIG. 16 is a partial cutaway view of a console support structure according to another embodiment.

FIG. 16 is a partial cutaway perspective view of a console support structure 1600 according to another embodiment showing an example thin client compartment 1608 (which is similar to the thin client storage compartments 132, 132 and 136 in FIG. 1). The console support structure 1600 includes horizontally spaced apart first and second leg structures 1602 and 1604 interconnected by a lateral support structure 1606. The thin client compartment 1608 is mounted to the lateral support structure (near the first leg structure 1602). The first and second leg structures 1602 and 1604 are similar to the leg structure 1440 in FIG. 14C. Only the rectangular loop frame 1610 of the first leg structure 1602 is shown so that the thin client enclosure is visible. Example computer hardware 1612 (such as a thin client) is shown in the thin client compartment 1608.

Figure 17A:
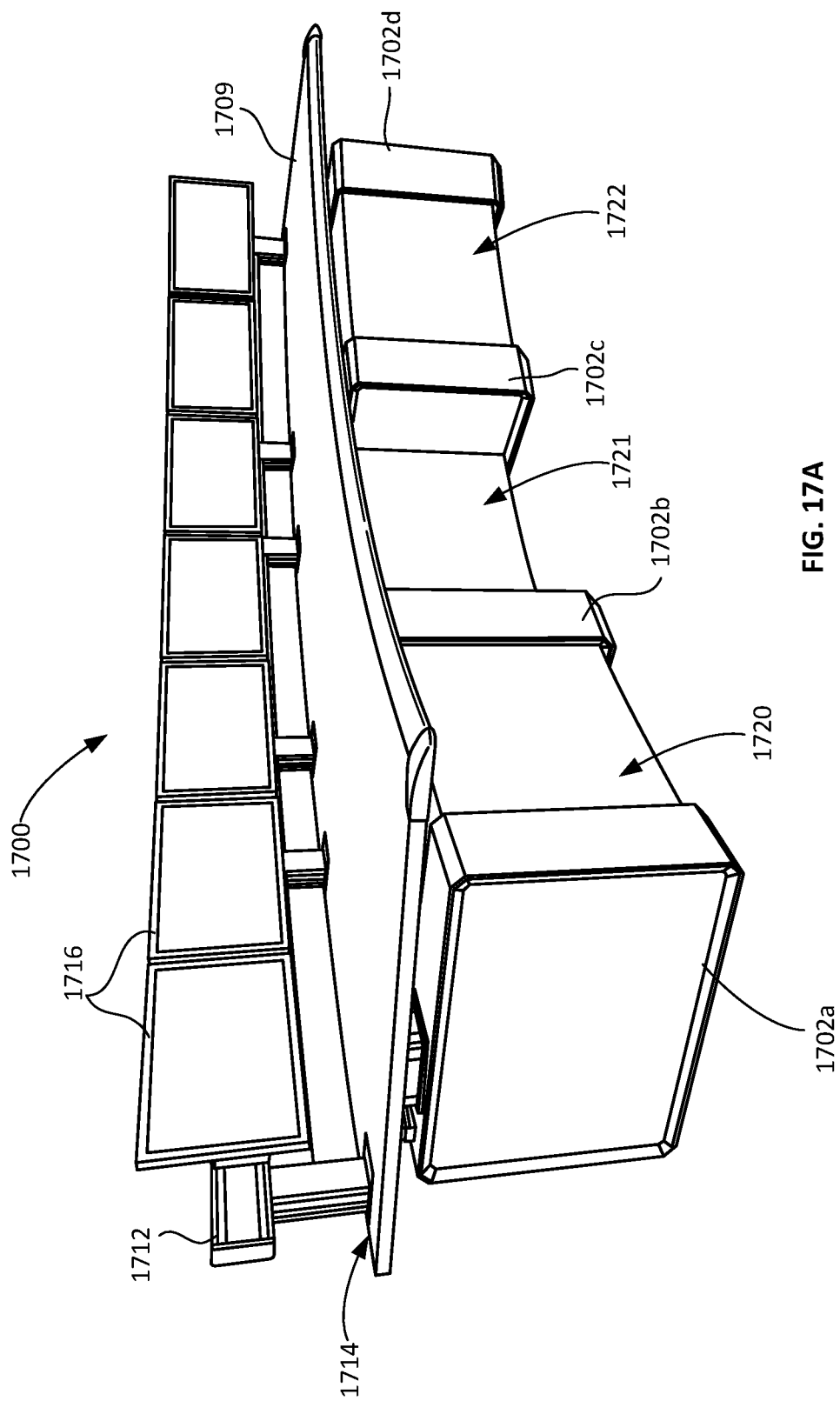
FIGS. 17A and 17B are front and rear perspective views of another example console according to an embodiment.
Figure 17B:
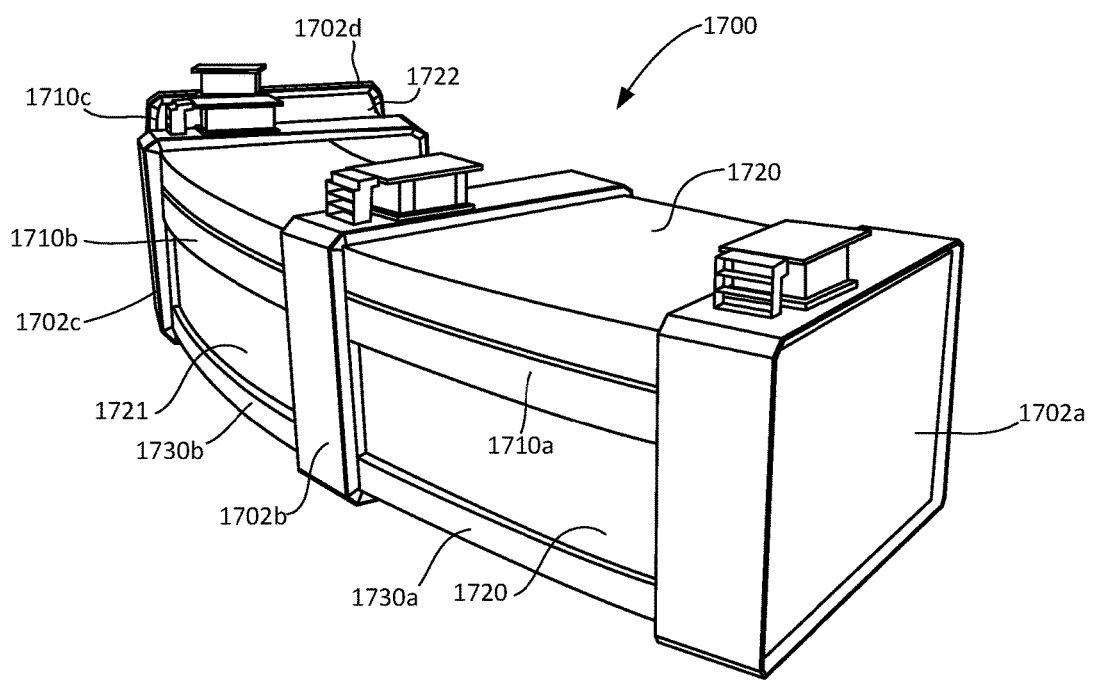

FIG. 17A is a front perspective view of a console 1700 according to yet another embodiment. FIG. 17B is a rear perspective view of the console 1700 of FIG. 17A (with a work surface 1709, slat rail 1712 and displays 1716 removed). The console 1700 is similar to the console 100 of FIG. 1, but including first, second and third storage compartments. The console 1700 includes a first leg structure 1702a, a second leg structure 1702b, a third leg structure 1702c and a fourth leg structure 1702d spaced apart from one another. The leg structures 1702a, 1702b, 1702c and 1702d are similar to the leg structures 102, 104, 106 and 108 of FIG. 1. Similar to the console 100 shown in FIG. 1, the console 1700 in FIG. 12 has first, second and third lateral support structures 1710a, 1710b and 1710c (shown in FIG. 17B) interconnecting adjacent pairs of the leg structures 1702a, 1702b, 1702c and 1702d. The leg structures 1702a, 1702b, 1702c and 1702d. and lateral support structures 1710a, 1710b and 1710c together form a support structure for the console 1700.

The second and third leg structures 1702a and 1702d are similar to the leg structure 600 in FIG. 6. The second and third leg structures 1702b and 1702c are also similar to the leg structures the leg structure 600 in FIG. 6, but are provided with female pivot pieces on both sides for connection to the corresponding lateral support structures 1710b, 1710c and 1710d.

The leg structures 1702a, 1702b, 1702c and 1702d support a work surface 1709. The work surface 1709 has a slat rail 1712 mounted thereon near a rear 1714 of the work surface, and a plurality of displays 1716 mounted to the slat rail. The slat rail 1712 and displays 1716 are shown only be way of example, and other equipment may be used with the console.

The closed configuration of the console 1700 shown in FIG. 17A includes a first, full depth storage compartment 1720 between the first and second leg structures 1702a and 1702b, as well as a second, full depth storage compartment 1722 between the third and fourth leg structures 1702c and 1702d. A third, partial depth storage compartment 1721 extends between the second and third leg structures 1702b and 1702c.

The storage compartments 1720, 1721 and 1722 may include wheels for wheeling the storage compartments 1720, 1721 and 1722 into position. The storage compartments may also be connected to the respective lateral support structures 1710a, 1710b and 1710c, similar to other compartments or enclosures described herein.

As seen in FIG. 17B, the console 1700 further includes lower cable raceways or conduits 1730a and 1730b that are generally parallel to the lateral support structures 1710a and 1710b. A third lower cable conduit (not visible) is parallel to the lateral support structure 1710c. The storage compartments 1720, 1721 and 1722 are shaped to provide clearance for the respective lateral support structures 1710a to 1710c and lower cable conduits 1730a and 1730b.

It will be appreciated that several variations of storage compartments may be constructed by attaching covers (such as panels) to the console support structures described herein. For example, various sizes and shapes of storage compartments may be created.

Figure 18:
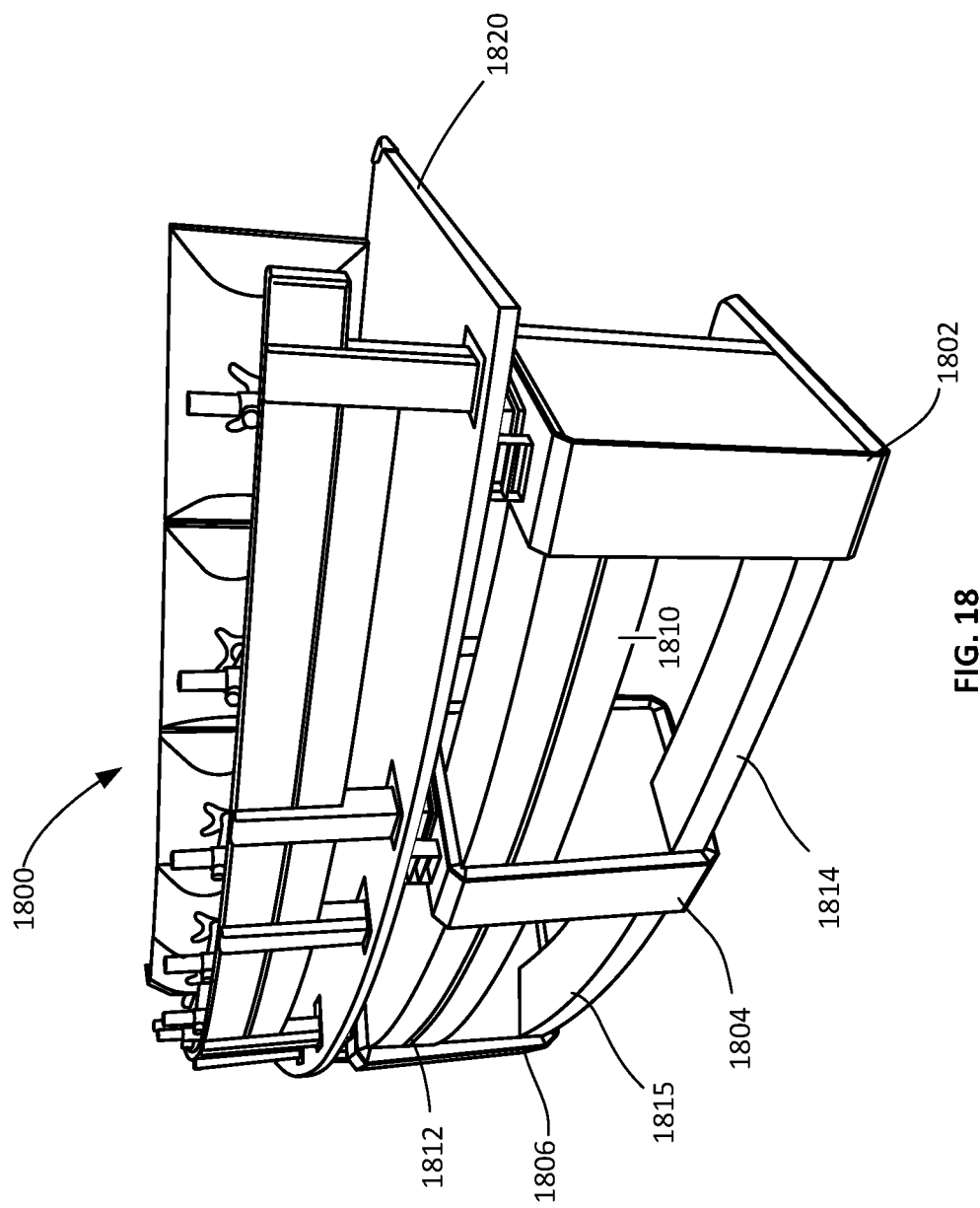
FIG. 18 is a perspective view of an example console according to yet another embodiment.

FIGS. 18 to 22 show additional variations of the console system described herein according to some embodiments. FIG. 18 is a rear perspective view of a console 1800 according to still another embodiment. The console 1800 is similar to the console 100 of FIG. 1, including spaced apart leg structures 1802, 1804, 1806 interconnected by lateral support structures 1810 and 1812. The console 1800, however, also includes additional lower cable raceway enclosures 1814 and 1815 beneath the lateral support structures 1810 and 1812. The first leg structure 1802 is similar to the leg structure 800 shown in FIG. 18A. The lateral support structures 1810 and 1812 curve along their length. A work surface 1820 mounted to the leg structures 1802, 1804, 1806 follows a similar curved profile.

Figure 19:
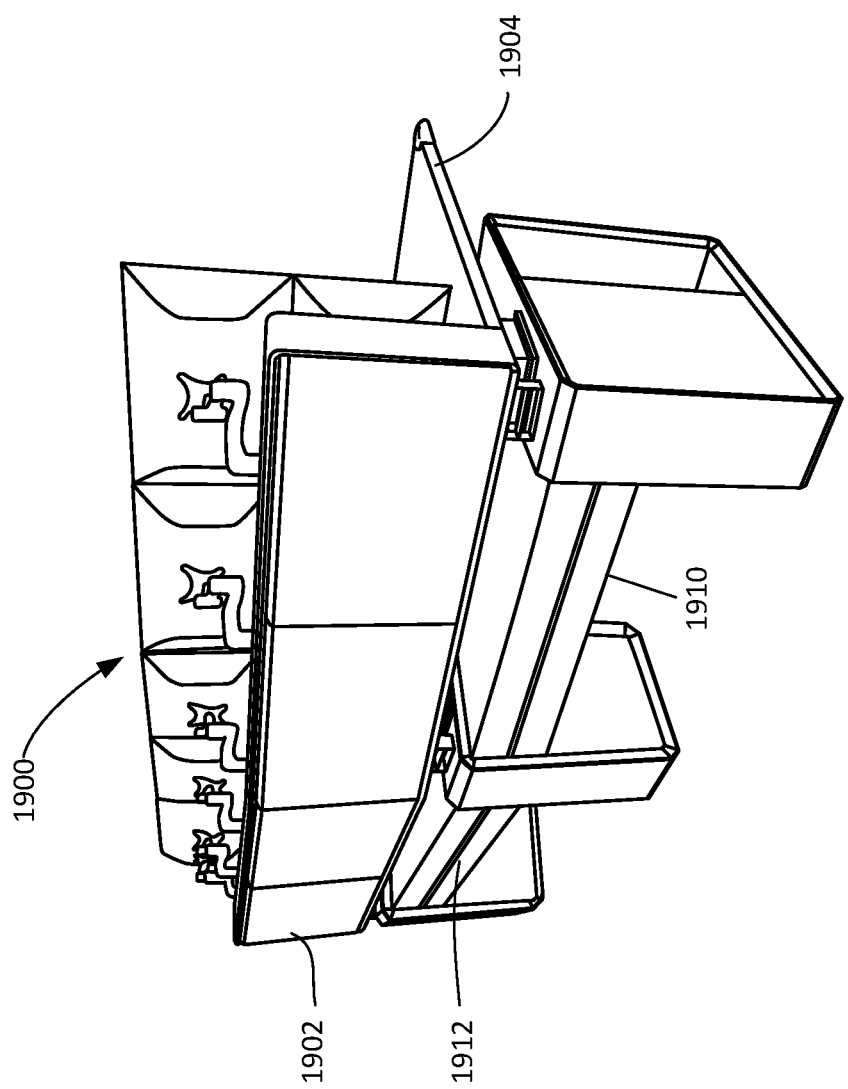
FIG. 19 is a rear perspective view of a console according to still another embodiment.

FIG. 19 is a front perspective view of yet another example console 1900 having a slat wall 1902 mounted to a work surface 1904. As shown, the lateral support structures 1910 and 1912 in this example are straight, rather than curved, along their length.

Figure 20:
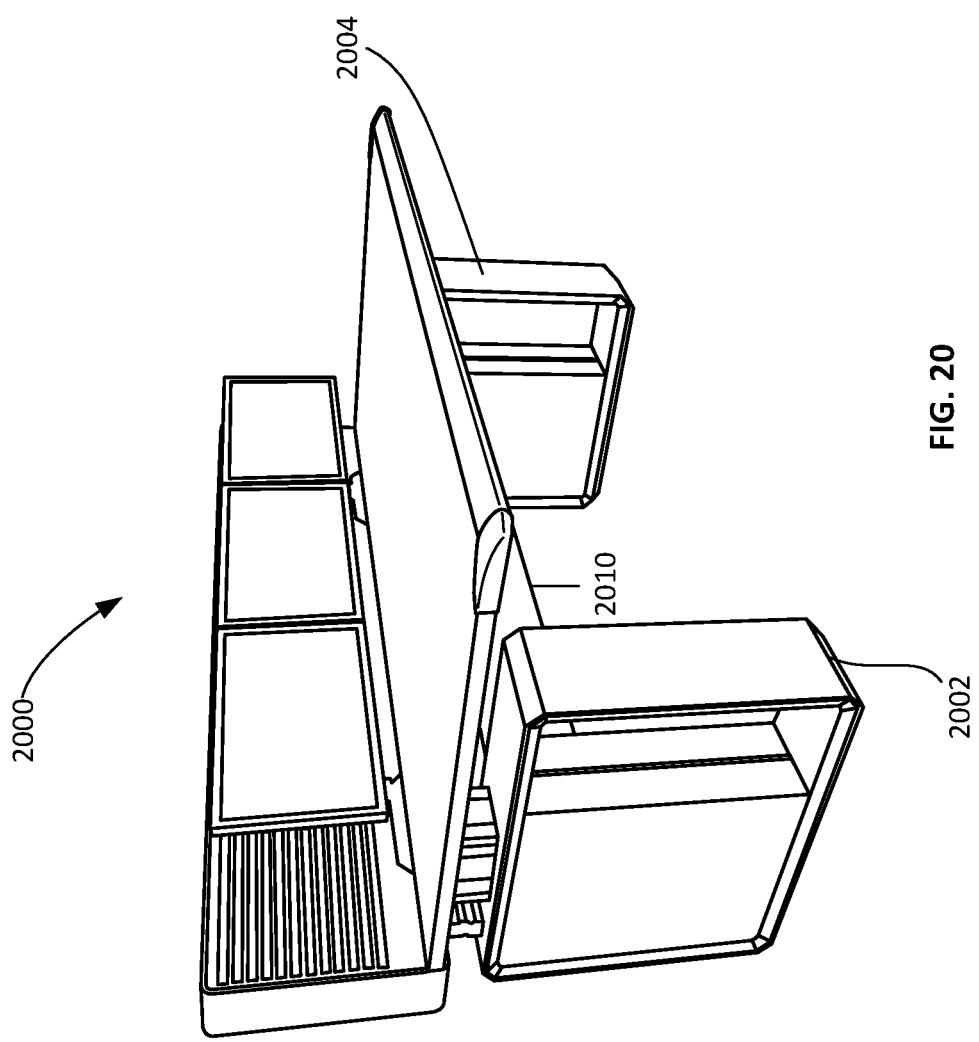
FIG. 20 is a front perspective view of yet another example console having a slat wall mounted to a work surface.

FIG. 20 is a front perspective view of another example console 2000 that includes first and second leg structures 2002 and 2004 (each similar to the leg structure 840 in FIG. 18C). A single lateral support structure 2010 interconnects the leg structures 2002 and 2004.

Figure 21:
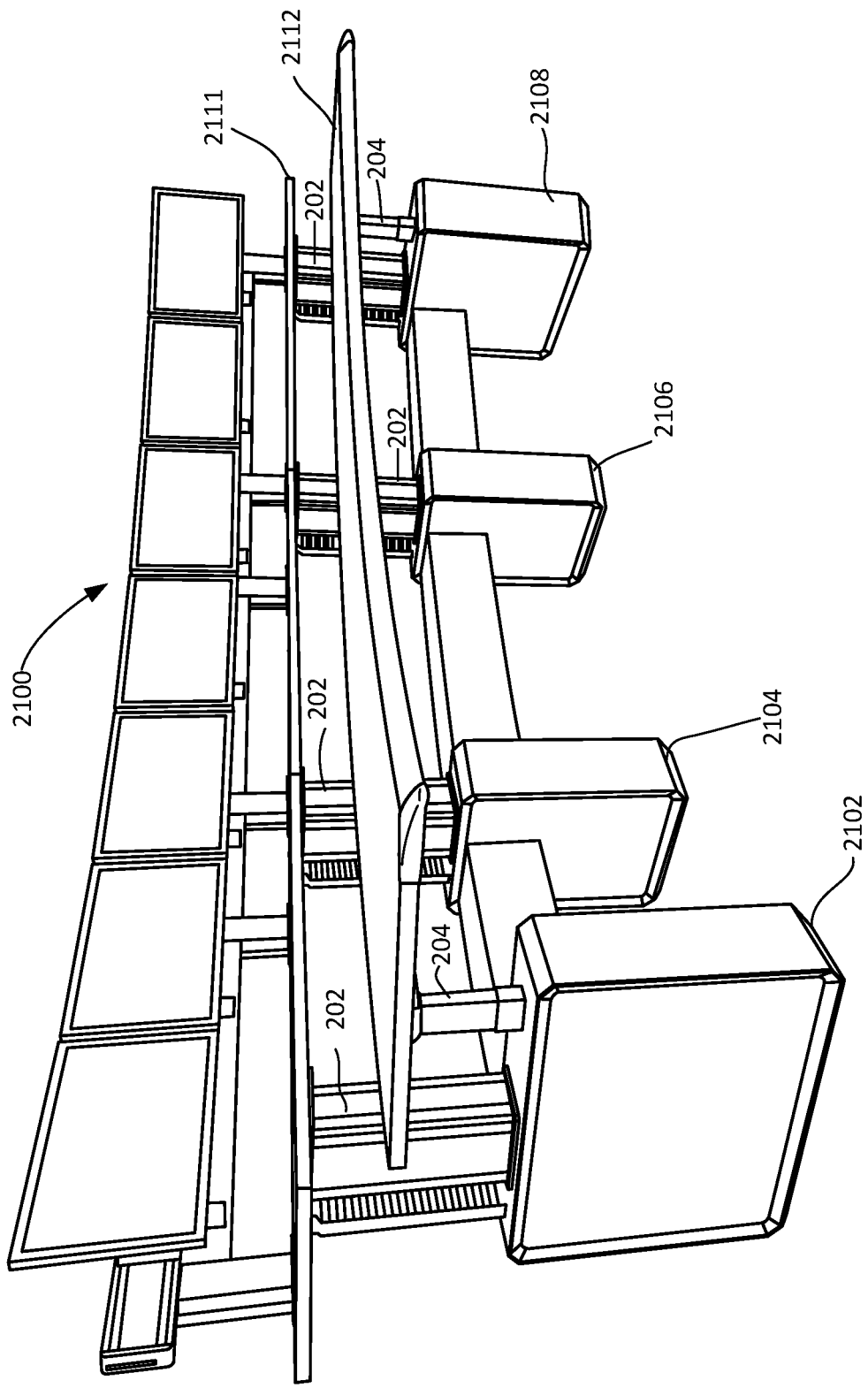
FIG. 21 is a front perspective view of an example console according to another embodiment.

FIG. 21 is a front perspective view of another example console 2100. The console 2100 is similar to the console 100 in FIG. 1, but has a "split" work surface, including first work surface 2111 and second work surface 2112. Each leg structure 2102, 2104, 2106 and 2108 has respective first lifts 202. The first and fourth leg structures 2102 and 2108 each include a respective second lift 204. The first work surface 2111 is supported by the first lifts 202 and the second work surface 2112 is supported by the second lifts 204.

Figure 22:
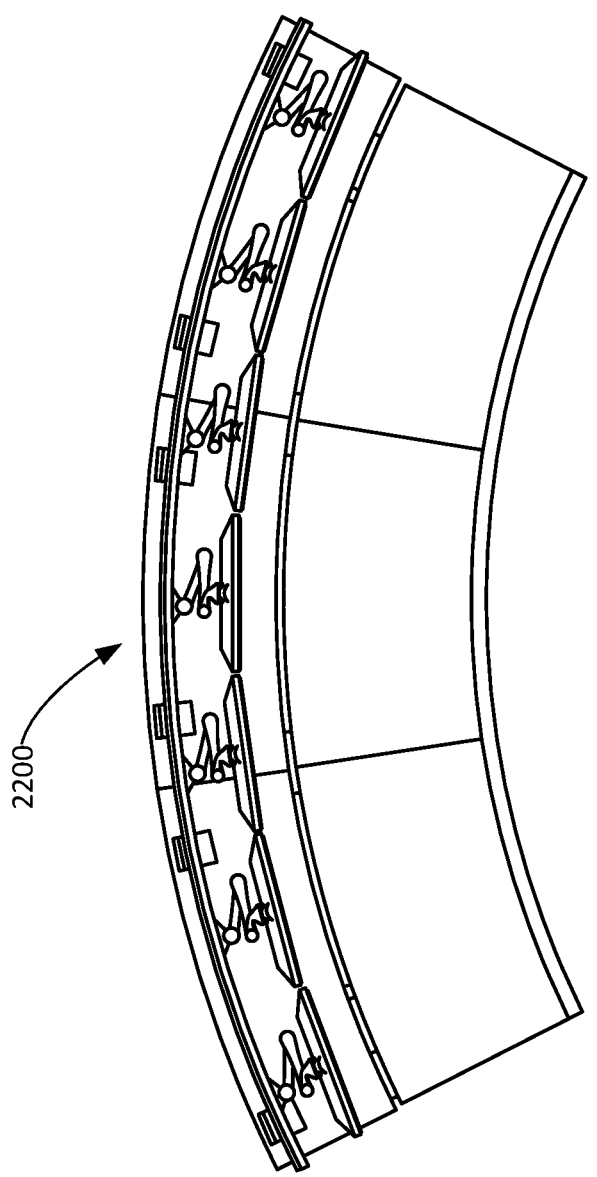
FIG. 22 is a top perspective view of the console of FIG. 21.

FIG. 22 is a top view of the console 2200 of FIG. 21. FIG. 22 shows the horizontal curvature of the console 2200.

Figure 23:
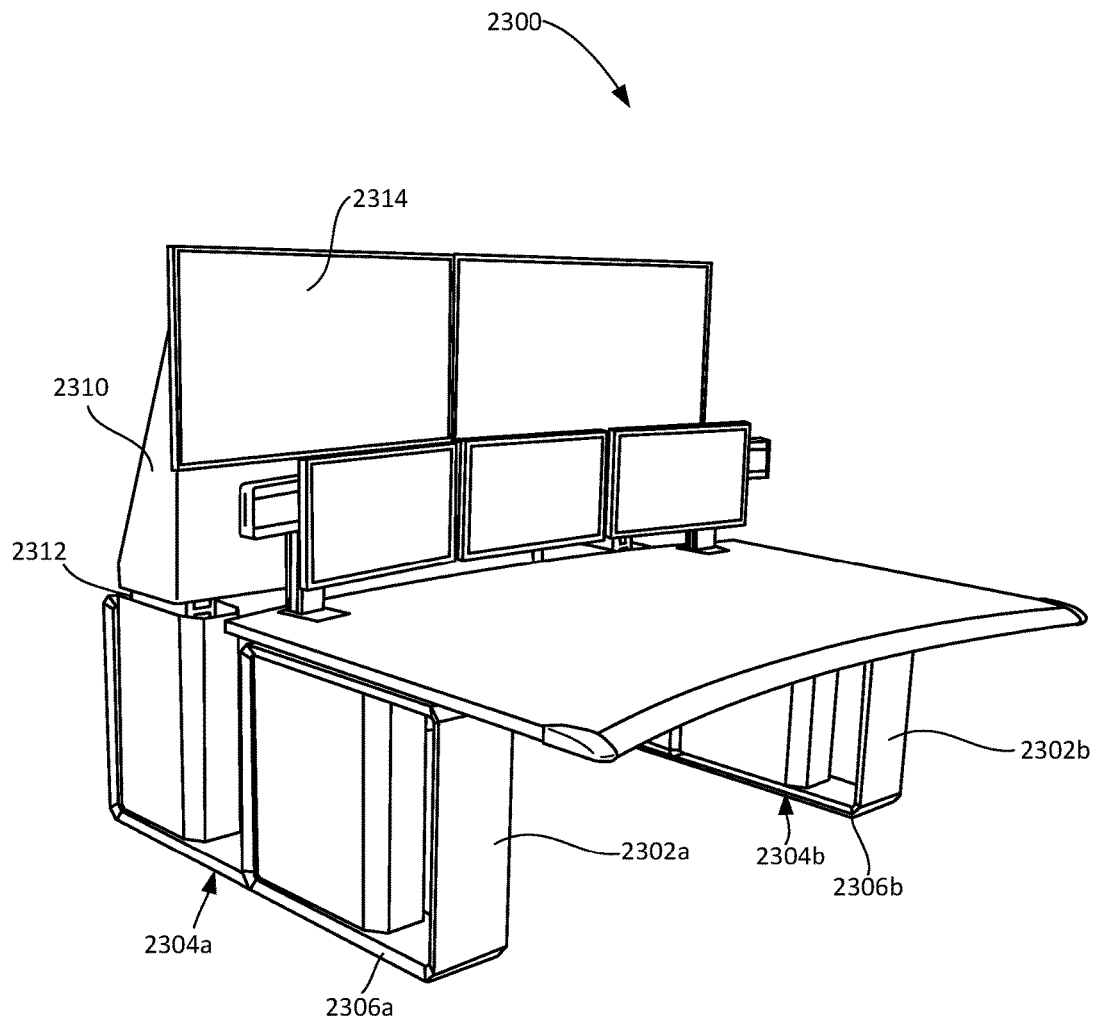
FIG. 23 is a front perspective view of yet another example console according to some embodiments.

The extrusion-type base of the leg structures described herein (e.g. base 200 in FIG. 2B) may provide for highly customizable console configurations. As discussed above, the number and placement of vertical lifts (or other vertically adjustable supports) may be customized. Other equipment may be mounted on such bases as well. In some embodiments, the base may be extended to mount equipment either in front or behind of a work surface. The FIG. 23 is a perspective view of another example console 2300 according to some embodiments. In this example, first and second leg structures 2302a and 2302b each have a respective base portion 2304a and 2304b. The base portion 2304a and 2304b each include a respective housing 2406a and 2406b that covers a base extrusion (not visible) with ports along its length that is similar to the base 202 shown in FIG. 2B, which extends the entire length of the base portion 2304a and 2304b. The base portions 2304a and 2304b extend rearward farther than the work surface 2310 of the console 2300. The extended base portions 2304a and 2304b allow mounting of equipment thereon behind the work surface 2310. In this example, a display system 2320 is mounted on the base portions 2304a and 2304b. The display system includes vertical lifts 2312 and multiple displays 2314.

Figure 24A:
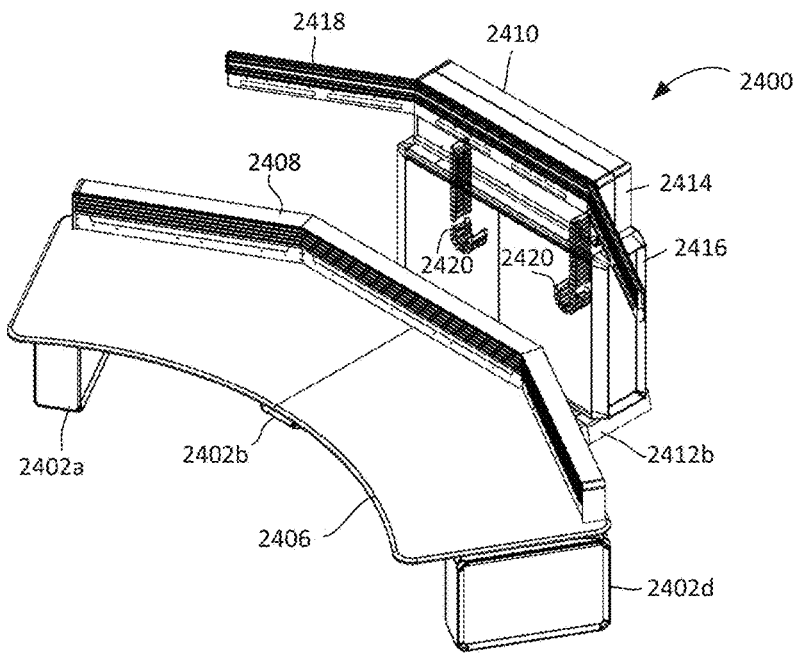
FIG. 24A is a front perspective view of a console according to yet another embodiment.
Figure 24B:
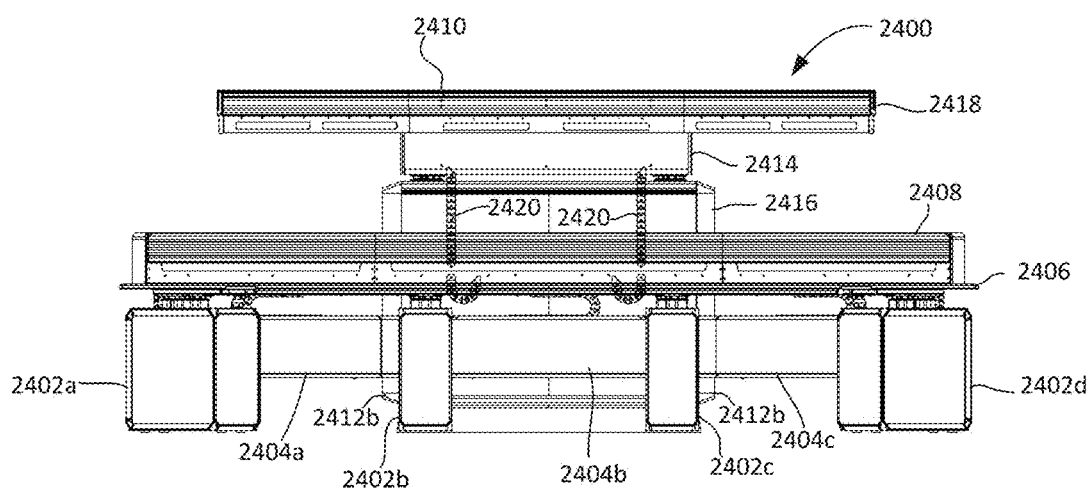
FIG. 24B is a front view of the console of FIG. 24A.

FIGS. 24A and 24B show a console 2400 according to yet another embodiment. The console 2400 comprises first, second, third and fourth leg structures 2402a, 2402b, 2402c and 2402d. First, second and third lateral support structures 2404a, 2404b and 2404c interconnect the first, second, third and fourth leg structures 2402a, 2402b, 2402c and 2402d, similar to other embodiments described herein. The first, second, third and fourth leg structures 2402a, 2402b, 2402c and 2402d are each similar to the leg structure 600 shown in FIG. 6. The first, second and third lateral support structures 2404a, 2404b and 2404c are each similar in structure to the lateral support section 500 in FIGS. 5A to 5E. The first, second, third and fourth leg structures 2402a, 2402b, 2402c and 2402d are vertically adjustable and support work surface 2406. A slat rail 2408 for supporting one or more displays and/or other equipment (not shown) is mounted over the work surface 2406. Displays mounted to the slat rail 2408 will be referred to as "primary" displays herein.

In this embodiment, the console 2400 includes a secondary display unit 2410 attached to the second and third leg structures 2402b and 2402c. Specifically, the secondary display unit 2410 includes two feet 2412a and 2412b which are connected to the second and third leg structures 2402b and 2402c respectively. The secondary display unit 2410 includes an upper portion 2414 and a lower portion 2416, with the upper portion 2414 mounted over the lower portion 2416. A slat rail 2418 is mounted to the upper portion 2414 and additional displays (referred to herein as "secondary displays") and/or other equipment may be mounted thereto. Any suitable equipment mounting means may be used, and embodiments are not limited to a slat rail. The upper portion 2414 may be vertically adjustable. For example, the upper portion 2414 may be supported on one or more vertically adjustable supports that connect to the upper portion 2414. The vertically adjustable supports may be driven by one or more motors. The console may include a controller that controls the motors driving the vertically adjustable supports. Such motors and/or controllers may be housed in the lower portion 2414, for example. The upper and lower portions 2414 and 2416 may also provide storage space therein for a variety of other equipment (e.g. cables, outlets, electronics, etc.).

Figure 24C:
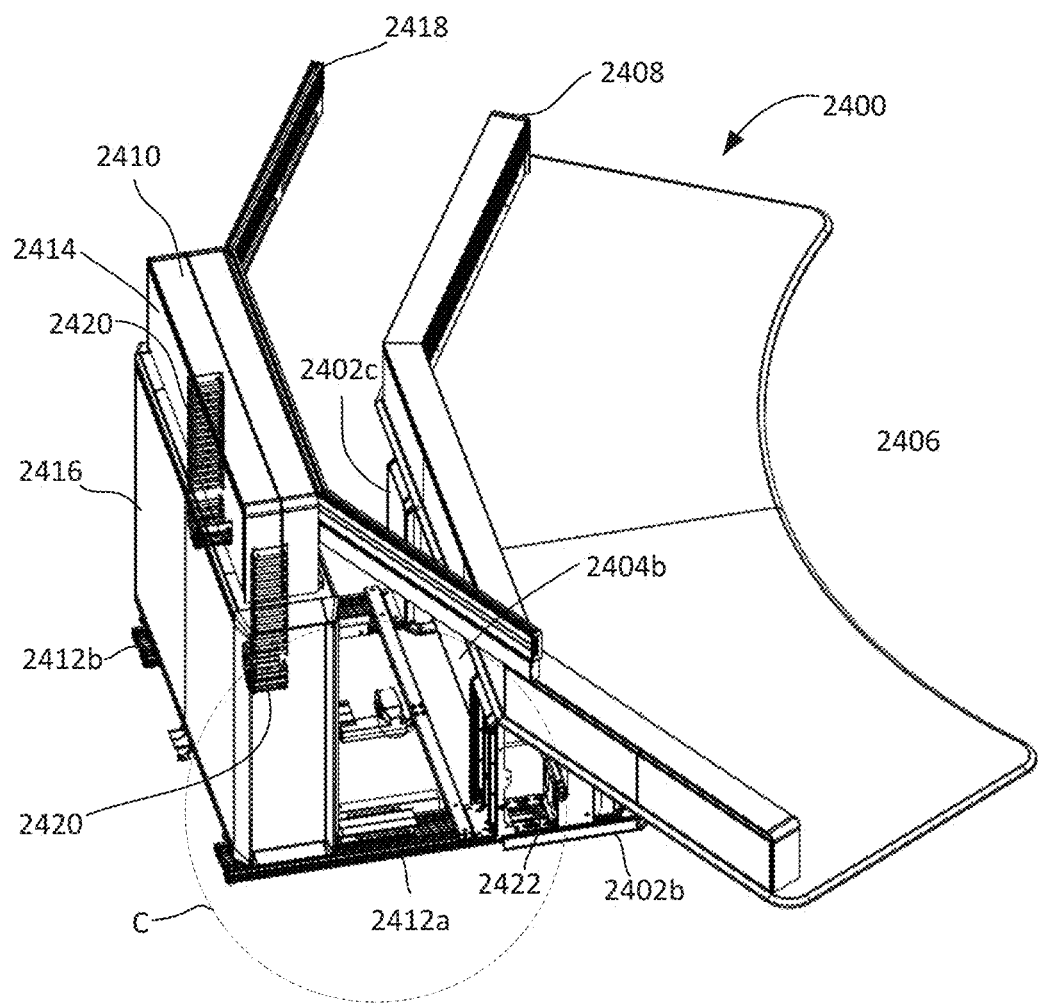
FIG. 24C is a rear view of the console of FIGS. 24A and 24B.

FIG. 24C is a rear perspective view of the console 2400. In FIG. 24C, the first and fourth leg structures 2402a and 2402b and the first and third lateral support structures 2404a and 2404c are removed to provide a better view of the connections between the secondary display unit 2410 and the second and third leg structures 2402b and 2402c. Outer coverings of the first and second feet 2412a and 2412b and the second leg structure 2402b are also removed in FIG. 23C. As shown, the first foot 2412a of the secondary display unit 2410 of the connects to a base 2422 of the second leg structure 2402b, and the second foot 2412b of the secondary display unit 2410 connects to a corresponding base of the third leg structure 2402c.

Cable management chains 2420 are shown in FIGS. 24A to 24C that provide a cable pathway between the interior of the upper portion 2414 and the interior of the lower portion 2416. Cable management chains 2420 are shown for illustrative purposes, but they will normally be substantially hidden within the upper portion 2414 and the lower portion 2416.

Figure 24D:
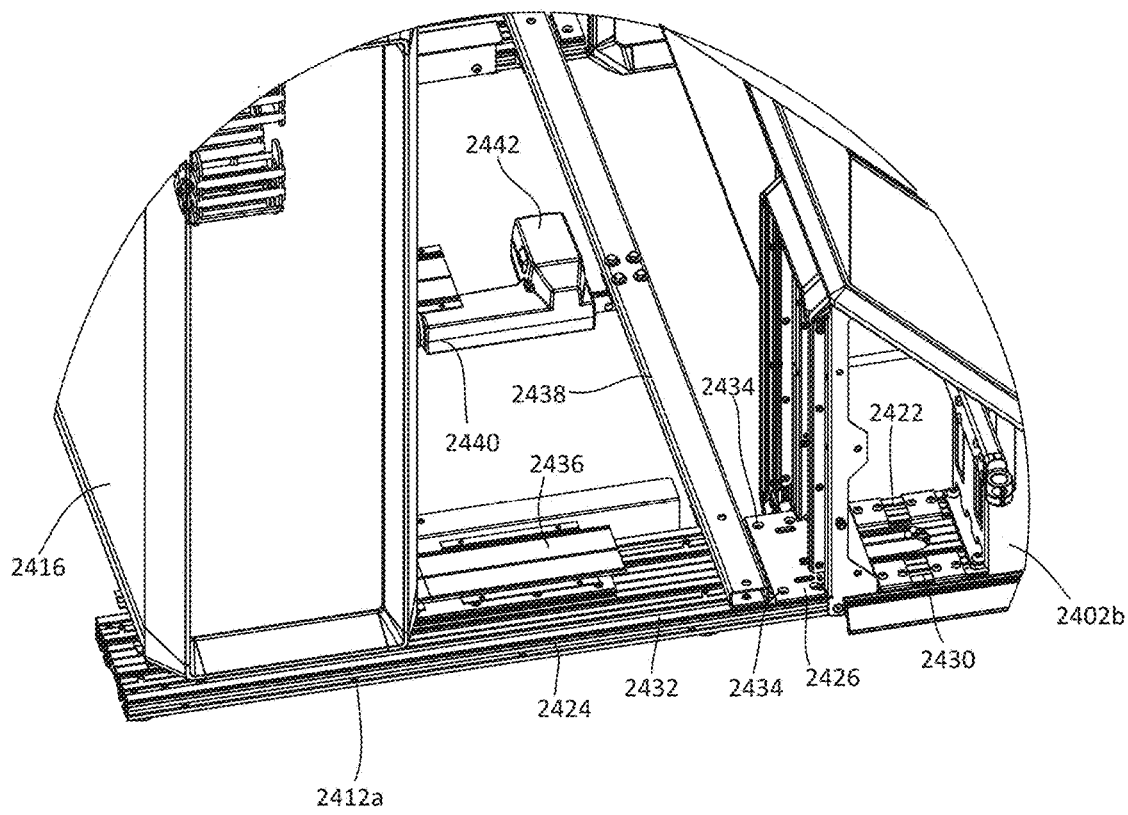
FIG. 24D is an enlarged view of the portion of the console within circle "C" in FIG. 24C.
Figure 24E:
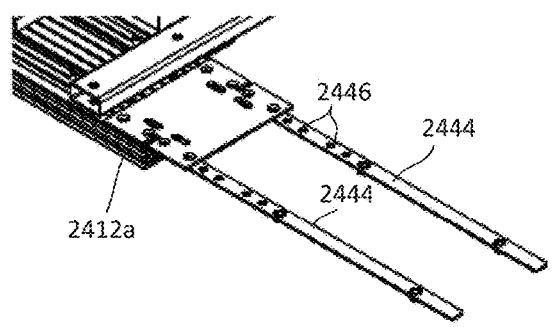
FIG. 24E is an enlarged partial view of a first foot of the console of FIG. 24D.

FIG. 24D is an enlarged view of the portion of the console 2400 within circle "C" in FIG. 24C. As shown, the first foot 2412a of the secondary display unit 2410 includes an extrusion base 2424 with a profile similar to the base 2422 of the second leg structure 2402b. The base 2424 of the first foot 2412a abuts the base 2422 of the second leg structure 2402b. The base 2422 of the leg structure defines upward facing, elongated ports 2430 for receiving fastening hardware that are aligned with and abut similar elongated ports 2432 of the base 2424 of the first foot 2412a. A splining plate 2426 partially overlies the base 2424 and the base 2422. Connection strips 2444 with threaded holes 2446 (shown in FIG. 24E) may be inserted in the ports 2430 and 2432. At least some of the holes 2446 of the strips are aligned with holes 2434 of the splining plate, such that fastening hardware (not shown) can secure the splining plate to both the second leg structure 2412b and the first foot 2412a. FIG. 24E is an enlarged partial view of the first foot 2412a of FIG. 24D, but also showing example connection strips 2444.

As also shown in FIG. 24D, the first foot 2412a includes a horizontal guiderail 2436 on which the lower portion 2416 of the secondary display unit 2410 is mounted. The second foot 2412b includes a similar guiderail (not shown in FIG. 24D). The lower portion 2416 of the secondary display unit 2410 is slidably mounted on the guiderails 2436 of the first foot 2412a and the second foot 2412b to allow forward and backward movement. In this example, a cross beam 2438 is mounted between the first and second feet 2412a and 2412b, and a horizontal telescoping actuator 2440 interconnects the lower portion 2416 and the cross beam 2438. A motor 2442 drives the horizontal actuator 2440. A controller (not shown) may be included to control the motor 2442 and thereby control the horizontal position of the secondary display unit. Thus, the horizontal and vertical position of the slat rail 2418 may be adjusted. Vertical and horizontal movement of the secondary display unit 2410 is optional and may be manual or automatic. The secondary display unit 2410 may also be static (omitting vertical and/or horizontal adjustment components) in other embodiments.

The work surface 2406 may be adjusted for sitting and standing configurations. The vertical position of the work surface 2406 may be synchronized or otherwise correspond to the vertical position of the slat rail 2418, for example, to coordinate the positions of the primary and secondary displays. The apparatus 2400 may include a controller (not shown) that automatically adjusts the height of the slat rail 2418 responsive to adjustment of the work surface. The controller may include a processor and memory and input means for receiving input to adjust the height of the work surface 2406 and/or slat rail 2418. When synchronized, a single input device may adjust the height of both the work surface 2406 and/or slat rail 2418. Alternatively, two or more controllers or input devices may be used to control the heights separately and individually. The horizontal position of the slat rail 2418 may also be coordinated or synchronized with the height of the work surface 2406 in some embodiments.

Figure 25:
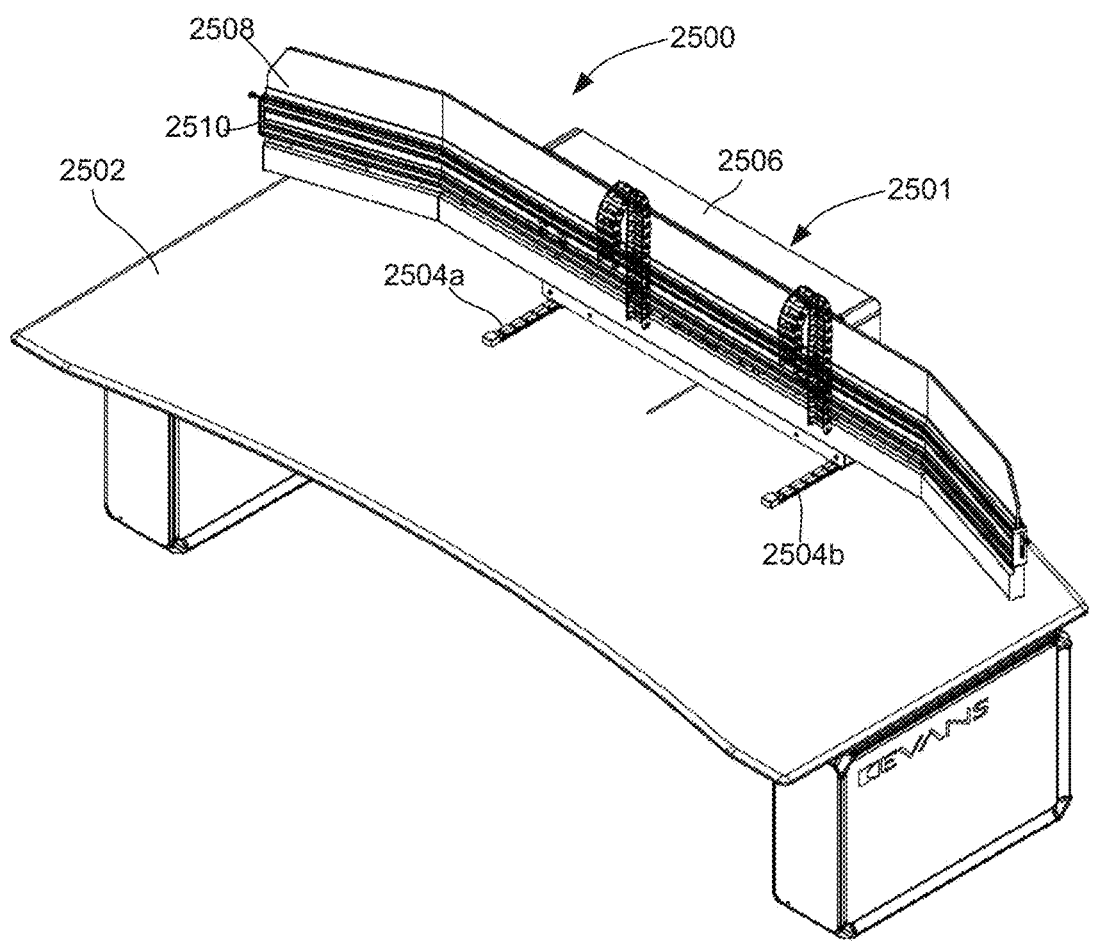
FIG. 25 is a perspective view of a console according to still another embodiment.

FIG. 25 is a perspective view of a console 2500 according to yet another embodiment. The console 2500 is similar to other consoles described herein with lifts (not shown) that adjust the height of a work surface 2502 of the console 2500. The console 2500 in this example includes an adjustable equipment mounting apparatus 2501 on its work surface 2506. The apparatus 2501 includes first and second horizontal guide rails 2504*a* and 2504*b* mounted on the work surface 2502, a body 2506 mounted on the guiderails 2504*a* and 2504*b*, and an equipment mounting section 2508 mounted to the front of the body 2506. The equipment mounting section 2506 includes a slat rail 2510. Various equipment, such as displays, speakers, etc. may be mounted to the slat rail 2510. Embodiments are not limited to slat rails, and other mounting means may be included.

In this example, the body 2506 is horizontally movable along the first and second guiderails 2504*a* and 2504*b*. The horizontal movement of the apparatus 2501 may be manual or motorized. The movement may be user-controlled and/or automatic responsive to adjustments to the height of the work surface 2502. The apparatus 2501 may include one or more lifts (not shown) for vertical adjustment of the height of the equipment mounting section 2508. For example, one or more lifts may be located mainly in the body 2506 of the apparatus. Any suitable means for vertical movement of the equipment mounting section may be used. As with the horizontal movement, the vertical movement may be user controller and/or automatic in response to adjustments to the height of the work surface 2502.

The height of the equipment mounting section 2508 may be synchronized or otherwise be automatically adjusted responsive to the height of the work surface 2502, similar to the secondary display unit 2410 of FIGS. 24A to 24E.

In some embodiments a console support structure may includes two or more leg structures for supporting a work surface. The support structure may include one or more lateral support structures as described herein. Alternatively, the lateral support structure(s) may be omitted, as in the example of FIGS. 15A and 15B.

In some embodiments, a console support structure may include two or more leg structures for supporting a work surface and one or more lateral support structures interconnecting the leg structures, as described herein. The leg structures may include one or more vertically adjustable supports for a work surface. Alternatively, the leg supports may be static supports for the work surface (i.e. not vertically adjustable). The lateral support structure may define an interior space for cable management and/or equipment storage, as described above. The lateral support section(s) may be pivotably connected to the leg structures as described above. Alternatively, the pivoting function may be omitted and the connection may have a set relative angle, or multiple discrete possible angles between the leg structures and the lateral support structure(s). The relative angle may not be adjustable in some embodiments.

It is to be understood that the various components (e.g. panels, covers, frames, beams, etc.) described herein may comprise metal or any other suitable material. For example, one or more covers may comprise wood, plastic, or composite materials. Embodiments are not limited to any specific materials.

What has been described is merely illustrative of the application of the principles of the disclosure. Other arrangements and methods can be implemented by those skilled in the art without departing from the scope of the present disclosure.

The invention claimed is:

1. A console support structure comprising:
   two or more leg structures horizontally spaced apart, each said leg structure comprising a respective base and at least one respective vertically adjustable support mounted on the base, the vertically adjustable supports of the leg structures being for supporting at least one work surface;
   for each adjacent pair of the two or more leg structures, a respective elongated lateral support structure extending between and interconnecting the pair of leg structures,
   wherein, for each said pair of the two or more leg structures, the respective lateral support structure is releasably and pivotably connected to each said leg structure of the pair.

2. The console support structure of claim 1, wherein the at least one lateral support structure is elevated with respect to the bases of the leg sections.

3. The console support structure of claim 1, wherein each lateral support structure comprises a respective interior space along a length of the lateral support structure for at least one of equipment storage and cable management.

4. The console support structure of claim 3, wherein each lateral support section comprises at least one cable raceway within the interior space.

5. The console support structure of claim 1, wherein each said leg structure comprises at least one respective pivot connector for pivotably connecting to the corresponding one or more lateral support structures, and
   each said lateral support structure is releasably and pivotably connected to the pivot connectors of the corresponding pair of leg structures.

6. The console support structure of claim 5, wherein each lateral support structure comprises one or more support beams interconnecting the respective pair of leg structures, each support beam having opposite first and second ends, each said end being releasably and pivotably connected to the respective leg structure.

7. The console support structure of claim 6, wherein each lateral support structure further comprises:

a respective plurality of spaced apart frames, each said frame being mounted to the at least one support beam; and a plurality of outer covers mounted to at least one of: the at least one support beam; and the frames.

8. The console support structure of claim 6, wherein the at least one support beam comprises first and second beams that are vertically spaced apart, vertically aligned and substantially parallel.

9. The console support structure of claim 1, wherein, for each leg structure, the at least one vertically adjustable support comprises at least one vertical lift.

10. The console support structure of claim 1, wherein, for each said leg structure, the respective base defines at least one elongated port for receiving fastening hardware to selectively secure the at least one vertically adjustable support to the base at variable positions along a length of the at least one elongated port.

11. A console comprising:
the console support structure of claim 1; and
the at least one work surface, mounted on and supported by the vertically adjustable supports of the leg structures.

12. The console of claim 11, wherein, for each leg structure, the respective at least one vertically adjustable supports comprises first and second spaced apart vertically adjustable supports,
the at least one work surface comprising: a first work surface mounted to and supported by the first vertical lifts of the leg structures; and a second work surface mounted to and supported by the second vertical lifts of the leg structures.

13. The console of claim 11, further comprising at least one storage compartment attachable to the lateral support structure.

14. The console of claim 13, wherein said at least one storage compartment comprises wheels for rolling the at least one storage compartment into a position abutting the lateral support structure.

15. The console of claim 13, wherein each lateral support structure comprises one or more support beams, at least one of said at least one storage compartment is attachable to at least one of said one or more support beams.

16. The console of claim 13, wherein the at least one storage compartment is for storing computer hardware.

17. A console support structure comprising:
two or more leg structures horizontally spaced apart, each said leg structure comprising a respective base;
for each adjacent pair of leg structures, a respective elongated lateral support structure extending between and interconnecting the pair of leg structures, the lateral support structure being releasably and pivotably connected to each of the pair of leg structures for allowing adjustment of the relative angle of the leg structures with respect to the lateral support structure.

18. A console support structure comprising:
two or more leg structures horizontally spaced apart, each said leg structure comprising a respective base;
for each adjacent pair of leg structures, a respective elongated lateral support structure extending between and interconnecting the pair of leg structures, the lateral support structure being releasably and pivotably connected to each of the pair of leg structures for allowing adjustment of the relative angle of the leg structures with respect to the lateral support structure,
wherein, for each said pair of the two or more leg structures, the respective lateral support structure is releasably and pivotably connected to each said leg structure of the pair.

19. A console support structure comprising:
two or more leg structures horizontally spaced apart, each said leg structure comprising a respective base and at least one respective vertically adjustable support mounted on the base, the vertically adjustable supports of the leg structures being for supporting at least one work surface,
wherein, for each said leg structure, the respective base defines at least one elongated port for receiving fastening hardware to selectively secure the at least one vertically adjustable support to the base at variable positions along a length of the at least one elongated port.

* * * * *